United States Patent
Afshari (10) Patent No.: US 9,765,459 B2
(45) Date of Patent: Sep. 19, 2017

(54) VAPOR-PERMEABLE, SUBSTANTIALLY WATER-IMPERMEABLE MULTILAYER ARTICLE

(75) Inventor: Mehdi Afshari, Midlothian, VA (US)

(73) Assignee: Fiberweb, LLC, Wilmington, DE (US)

( * ) Notice: Subject to any disclaimer, the term of this patent is extended or adjusted under 35 U.S.C. 154(b) by 226 days.

(21) Appl. No.: 13/530,432

(22) Filed: Jun. 22, 2012

(65) Prior Publication Data

US 2012/0328842 A1 Dec. 27, 2012

Related U.S. Application Data

(60) Provisional application No. 61/500,694, filed on Jun. 24, 2011.

(51) Int. Cl.
*D04H 1/4374* (2012.01)
*B32B 27/12* (2006.01)
(Continued)

(52) U.S. Cl.
CPC ......... *D04H 1/4374* (2013.01); *B29C 55/023* (2013.01); *B29C 55/06* (2013.01); *B29C 55/08* (2013.01); *B29C 55/18* (2013.01); *B32B 5/022* (2013.01); *B32B 27/12* (2013.01); *B32B 27/20* (2013.01); *B32B 27/205* (2013.01);
(Continued)

(58) Field of Classification Search
CPC ....... B32B 27/12; B32B 27/20; B32B 27/205; B32B 27/32; B32B 27/325; B32B 5/022; B32B 2270/00; B32B 2307/724; B32B 2307/7265; B32B 2419/00; B29C 55/18; B29C 55/08; B29C 55/06; B29C 55/023;

C08L 23/10; C08L 23/06; C08L 23/20; C08L 45/00; C08L 23/16; C08L 23/0815; C08L 53/00; C08L 23/12; C08L 23/18; C08L 57/00; C08L 91/00; C08L 2666/04; C08L 2666/0208; C08L 2203/16; C08L 53/02; D04H 1/4374; D04H 1/541; D04H 1/42; C08K 5/01; C08K 5/0016;
(Continued)

(56) References Cited

U.S. PATENT DOCUMENTS 3,257,488 A  6/1966 Rasmussen et al.
3,808,639 A  5/1974 Tautvaisas
(Continued)

FOREIGN PATENT DOCUMENTS

EP  893530  1/1999
EP  979838  2/2000
(Continued)

OTHER PUBLICATIONS

International Preliminary Report on Patentability, mailed Jan. 3, 2014, in International Patent Application No. PCT/US2012/042397.
(Continued)

*Primary Examiner* — Nathan Van Sell
(74) *Attorney, Agent, or Firm* — McNair Law Firm, P.A.

(57) ABSTRACT

This disclosure relates to an article that includes a nonwoven substrate and a film supported by the nonwoven substrate. The film can include a first polymer and a polymer that is immiscible with the first polymer. The first polymer can include a polyolefin and the second polymer can include a polycycloolefin, a polymethylpentene, or a copolymer thereof.

19 Claims, 2 Drawing Sheets

(51) Int. Cl.
  B32B 5/02      (2006.01)
  B32B 27/20     (2006.01)
  B32B 27/32     (2006.01)
  D04H 1/541     (2012.01)
  C08L 53/02     (2006.01)
  C08L 23/10     (2006.01)
  B29C 55/02     (2006.01)
  B29C 55/06     (2006.01)
  B29C 55/08     (2006.01)
  B29C 55/18     (2006.01)

(52) U.S. Cl.
  CPC ............ *B32B 27/32* (2013.01); *B32B 27/325* (2013.01); *C08L 23/10* (2013.01); *D04H 1/541* (2013.01); *B32B 2270/00* (2013.01); *B32B 2307/724* (2013.01); *B32B 2307/7265* (2013.01); *B32B 2419/00* (2013.01); *C08L 53/02* (2013.01); *C08L 2203/16* (2013.01); *Y10T 428/24612* (2015.01); *Y10T 442/678* (2015.04)

(58) Field of Classification Search
  CPC .. A61L 2202/24; C08F 110/06; C08F 210/06;
      C08F 210/16; Y10T 442/678; Y10T
      428/24612
  USPC ......... 428/172, 174; 442/396, 398; 525/191;
      427/172
  See application file for complete search history.

(56) References Cited

U.S. PATENT DOCUMENTS

| | | |
|---|---|---|
| 4,284,671 A | 8/1981 | Cancio et al. |
| 4,376,147 A | 3/1983 | Byrne et al. |
| 4,452,845 A | 6/1984 | Lloyd |
| 4,472,328 A | 9/1984 | Sugimoto et al. |
| 4,517,714 A | 5/1985 | Sneed et al. |
| 4,522,203 A | 6/1985 | Mays |
| 4,582,871 A | 4/1986 | Noro et al. |
| 4,596,738 A | 6/1986 | Metcalfe et al. |
| 4,626,574 A | 12/1986 | Cancio et al. |
| 4,668,463 A | 5/1987 | Cancio et al. |
| 4,705,813 A | 11/1987 | Ito et al. |
| 4,725,473 A | 2/1988 | Van Gompel et al. |
| 4,753,840 A | 6/1988 | Van Gompel et al. |
| 4,777,073 A | 10/1988 | Sheth |
| 4,814,124 A | 3/1989 | Aoyama et al. |
| 4,898,761 A | 2/1990 | Dunaway et al. |
| 4,921,653 A | 5/1990 | Aoyama et al. |
| 4,929,303 A | 5/1990 | Sheth |
| 5,143,774 A | 9/1992 | Cancio et al. |
| 5,147,346 A | 9/1992 | Cancio et al. |
| 5,196,247 A | 3/1993 | Wu et al. |
| 5,200,247 A | 4/1993 | Wu et al. |
| 5,202,173 A | 4/1993 | Wu et al. |
| 5,240,216 A | 8/1993 | Lin et al. |
| 5,254,111 A | 10/1993 | Cancio et al. |
| 5,296,184 A | 3/1994 | Wu et al. |
| 5,308,693 A | 5/1994 | Ryle et al. |
| 5,336,457 A | 8/1994 | Wu et al. |
| 5,375,383 A | 12/1994 | Lin et al. |
| 5,382,461 A | 1/1995 | Wu |
| 5,404,927 A | 4/1995 | Bailey |
| 5,407,979 A | 4/1995 | Wu et al. |
| 5,409,761 A | 4/1995 | Langley |
| 5,422,172 A | 6/1995 | Wu |
| 5,435,108 A | 7/1995 | Overholt et al. |
| 5,445,874 A | 8/1995 | Shehata |
| 5,532,053 A | 7/1996 | Mueller |
| 5,555,923 A | 9/1996 | Leist et al. |
| 5,577,544 A | 11/1996 | Carper et al. |
| 5,592,690 A | 1/1997 | Wu |
| 5,615,723 A | 4/1997 | Carper |
| 5,626,176 A | 5/1997 | Lewis, Jr. et al. |
| 5,626,950 A | 5/1997 | Shimano et al. |
| 5,632,063 A | 5/1997 | Carper et al. |
| 5,634,216 A | 6/1997 | Wu |
| 5,636,678 A | 6/1997 | Carper et al. |
| 5,662,978 A | 9/1997 | Brown et al. |
| 5,679,422 A | 10/1997 | Lind et al. |
| 5,691,052 A | 11/1997 | Jones |
| 5,695,868 A | 12/1997 | McCormack |
| 5,709,259 A | 1/1998 | Lewis et al. |
| 5,709,921 A | 1/1998 | Shawver |
| 5,728,451 A | 3/1998 | Langley et al. |
| 5,759,926 A | 6/1998 | Pike et al. |
| 5,800,928 A | 9/1998 | Fischer et al. |
| 5,851,937 A | 12/1998 | Wu et al. |
| 5,855,999 A | 1/1999 | McCormack |
| 5,861,074 A | 1/1999 | Wu |
| 5,865,926 A | 2/1999 | Wu et al. |
| 5,869,414 A | 2/1999 | Fischer |
| 5,882,749 A | 3/1999 | Jones et al. |
| 5,882,789 A | 3/1999 | Jones et al. |
| 5,885,269 A | 3/1999 | Boyer, III et al. |
| 5,910,225 A | 6/1999 | McAmish et al. |
| 5,914,084 A | 6/1999 | Benson et al. |
| 5,939,181 A | 8/1999 | Kumano et al. |
| 5,942,080 A | 8/1999 | Mortellite et al. |
| 5,959,042 A | 9/1999 | Bouilloux et al. |
| 5,964,268 A | 10/1999 | Carper et al. |
| 5,992,497 A | 11/1999 | Jaehnen et al. |
| 6,006,817 A | 12/1999 | Stone et al. |
| 6,013,151 A | 1/2000 | Wu et al. |
| 6,015,764 A | 1/2000 | McCormack et al. |
| 6,037,281 A | 3/2000 | Mathis et al. |
| 6,045,900 A | 4/2000 | Haffner et al. |
| 6,047,761 A | 4/2000 | Jachnen et al. |
| 6,075,179 A | 6/2000 | McCormack et al. |
| 6,092,761 A | 7/2000 | Mushaben |
| 6,096,014 A | 8/2000 | Haffner et al. |
| 6,100,208 A | 8/2000 | Brown et al. |
| 6,110,849 A | 8/2000 | Tsai et al. |
| 6,123,134 A | 9/2000 | Thomas et al. |
| 6,133,168 A | 10/2000 | Doyle et al. |
| 6,179,939 B1 | 1/2001 | Jones et al. |
| 6,187,696 B1 | 2/2001 | Lim et al. |
| 6,191,055 B1 | 2/2001 | Boyer et al. |
| 6,191,221 B1 | 2/2001 | McAmish et al. |
| 6,214,147 B1 | 4/2001 | Mortellite et al. |
| 6,235,658 B1 | 5/2001 | Panzer et al. |
| 6,248,258 B1 | 6/2001 | Tomita et al. |
| 6,258,308 B1 | 7/2001 | Brady et al. |
| 6,260,601 B1 | 7/2001 | Thomas |
| 6,261,674 B1 | 7/2001 | Branham et al. |
| 6,264,864 B1 | 7/2001 | Mackay |
| 6,265,045 B1 | 7/2001 | Mushaben |
| 6,309,736 B1 | 10/2001 | McCormack et al. |
| H2000 H | 11/2001 | Middlesworth et al. |
| 6,348,258 B1 | 2/2002 | Topolkaraev et al. |
| 6,352,948 B1 | 3/2002 | Pike et al. |
| 6,368,444 B1 | 4/2002 | Jameson et al. |
| 6,369,292 B1 | 4/2002 | Strack et al. |
| 6,383,431 B1 | 5/2002 | Dobrin et al. |
| 6,437,064 B1 | 8/2002 | Eckstein et al. |
| 6,444,302 B1* | 9/2002 | Srinivas ............... B29C 55/005 264/288.8 |
| 6,475,591 B2 | 11/2002 | Mushaben |
| 6,479,154 B1 | 11/2002 | Walton et al. |
| 6,497,690 B2 | 12/2002 | Haarer |
| 6,497,691 B1 | 12/2002 | Bevins et al. |
| 6,506,695 B2 | 1/2003 | Gardner et al. |
| 6,511,568 B1 | 1/2003 | Eckstein et al. |
| 6,521,552 B1 | 2/2003 | Honna et al. |
| 6,541,072 B1 | 4/2003 | Doyle et al. |
| 6,605,172 B1 | 8/2003 | Anderson et al. |
| 6,610,163 B1 | 8/2003 | Mathis |
| 6,620,490 B1 | 9/2003 | Malchow |
| 6,623,586 B2 | 9/2003 | Mortellite et al. |
| 6,623,837 B2 | 9/2003 | Morman et al. |
| 6,638,636 B2 | 10/2003 | Tucker |
| 6,645,641 B2 | 11/2003 | Eckstein et al. |

(56) References Cited

U.S. PATENT DOCUMENTS

| | | |
|---|---|---|
| 6,649,548 B1 | 11/2003 | Shawver et al. |
| 6,653,523 B1 | 11/2003 | McCormack et al. |
| 6,656,581 B2 | 12/2003 | Wu et al. |
| 6,673,297 B2 | 1/2004 | Mushaben |
| 6,677,258 B2 | 1/2004 | Carroll et al. |
| 6,682,803 B2 | 1/2004 | McCormack et al. |
| 6,698,492 B2 | 3/2004 | Lewis, Jr. |
| 6,712,922 B2 | 3/2004 | Sorenson et al. |
| 6,713,159 B1 | 3/2004 | Blenke et al. |
| 6,740,184 B2 | 5/2004 | Mortellite et al. |
| 6,764,566 B1 | 7/2004 | Griesbach, III |
| 6,772,814 B2 | 8/2004 | Leist et al. |
| 6,776,947 B2 | 8/2004 | Brady et al. |
| 6,811,643 B2 | 11/2004 | McAmish et al. |
| 6,811,865 B2 | 11/2004 | Morman et al. |
| 6,818,083 B2 | 11/2004 | McAmish et al. |
| 6,821,915 B2 | 11/2004 | Morman et al. |
| 6,840,300 B2 | 1/2005 | Lewis, Jr. |
| 6,843,949 B2 | 1/2005 | Brady et al. |
| 6,849,324 B2 | 2/2005 | Meece et al. |
| 6,861,132 B2 | 3/2005 | Ikeda et al. |
| 6,909,028 B1 | 6/2005 | Shawver et al. |
| 6,946,182 B1* | 9/2005 | Allgeuer et al. ............... 428/92 |
| 6,951,591 B2 | 10/2005 | Mortellite et al. |
| 6,953,510 B1 | 10/2005 | Mackay et al. |
| 6,982,231 B1 | 1/2006 | Uitenbroek et al. |
| 7,059,379 B2 | 6/2006 | Lewis, Jr. et al. |
| 7,201,207 B2 | 4/2007 | Colston et al. |
| 7,270,723 B2 | 9/2007 | McCormack et al. |
| 7,270,889 B2 | 9/2007 | Campbell et al. |
| 7,307,031 B2 | 12/2007 | Carroll et al. |
| 7,378,565 B2 | 5/2008 | Anderson et al. |
| 7,381,666 B2 | 6/2008 | Little et al. |
| 7,393,799 B2 | 7/2008 | Porter |
| 7,405,009 B2 | 7/2008 | Ahmed et al. |
| 7,442,332 B2 | 10/2008 | Cancio et al. |
| 7,501,357 B2 | 3/2009 | Carroll et al. |
| 7,510,758 B2 | 3/2009 | Thomas et al. |
| 7,517,579 B2 | 4/2009 | Campbell et al. |
| 7,584,699 B2 | 9/2009 | Ford |
| 7,625,363 B2 | 12/2009 | Yoshimasa et al. |
| 7,625,620 B2 | 12/2009 | Kose |
| 7,625,829 B1 | 12/2009 | Cree et al. |
| 7,628,829 B2 | 12/2009 | Woo et al. |
| 7,629,000 B2 | 12/2009 | Sabesan |
| 7,629,042 B2 | 12/2009 | Jones et al. |
| 7,629,406 B2 | 12/2009 | Qian et al. |
| 7,629,416 B2 | 12/2009 | Li et al. |
| 7,631,760 B2 | 12/2009 | Guelzow et al. |
| 7,632,766 B2 | 12/2009 | Erb, Jr. et al. |
| 7,637,898 B2 | 12/2009 | Kuen et al. |
| 7,640,637 B2 | 1/2010 | Efremova et al. |
| 7,641,952 B2 | 1/2010 | O'Rourke et al. |
| 7,642,398 B2 | 1/2010 | Jaerpenberg et al. |
| 7,647,667 B2 | 1/2010 | Benjamin et al. |
| 7,648,607 B2 | 1/2010 | Morin |
| 7,648,752 B2 | 1/2010 | Hoying et al. |
| 7,648,771 B2 | 1/2010 | Day et al. |
| 7,650,716 B1 | 1/2010 | Schemeley |
| 7,651,653 B2 | 1/2010 | Morman et al. |
| 7,652,095 B2 | 1/2010 | Filiatrault et al. |
| 7,655,360 B2 | 2/2010 | Hennige et al. |
| 7,660,040 B2 | 2/2010 | Starry et al. |
| 7,662,137 B2 | 2/2010 | Sayama et al. |
| 7,662,473 B2 | 2/2010 | Aoki |
| 7,662,885 B2 | 2/2010 | Coffey et al. |
| 7,666,343 B2 | 2/2010 | Johnson et al. |
| 7,670,665 B2 | 3/2010 | Hoying et al. |
| 7,674,522 B2 | 3/2010 | Pohlmann |
| 7,674,733 B2 | 3/2010 | Wu et al. |
| 7,674,734 B2 | 3/2010 | Suzuki et al. |
| 7,674,949 B2 | 3/2010 | Wahlstrom et al. |
| 7,675,004 B2 | 3/2010 | Nakajima et al. |
| 7,678,221 B2 | 3/2010 | Takahashi et al. |
| 7,678,719 B2 | 3/2010 | Ogle et al. |
| 7,682,686 B2 | 3/2010 | Curro et al. |
| 7,686,903 B2 | 3/2010 | Muncaster et al. |
| 7,687,139 B2 | 3/2010 | Chan et al. |
| 7,690,069 B2 | 4/2010 | Chen et al. |
| 7,695,583 B2 | 4/2010 | Schneider et al. |
| 7,695,660 B2 | 4/2010 | Berrigan et al. |
| 7,695,799 B2 | 4/2010 | Cree |
| 7,695,812 B2 | 4/2010 | Peng et al. |
| 7,699,826 B2 | 4/2010 | Werenicz et al. |
| 7,699,827 B2 | 4/2010 | Sandin et al. |
| 7,700,504 B2 | 4/2010 | Tsujiyama et al. |
| 7,704,374 B2 | 4/2010 | Sommer et al. |
| 7,713,894 B2 | 5/2010 | Tsai et al. |
| 7,714,535 B2 | 5/2010 | Yamazaki et al. |
| 7,721,887 B2 | 5/2010 | Hancock-Cooke et al. |
| 7,722,591 B2 | 5/2010 | Baeck |
| 7,722,743 B2 | 5/2010 | Best et al. |
| 7,722,943 B2 | 5/2010 | Baldauf et al. |
| 7,723,246 B2 | 5/2010 | Baldauf et al. |
| 7,727,211 B2 | 6/2010 | LaVon et al. |
| 7,727,217 B2 | 6/2010 | Hancock-Cooke |
| 7,727,297 B2 | 6/2010 | Dauber et al. |
| 7,727,353 B2 | 6/2010 | Nair et al. |
| 7,727,915 B2 | 6/2010 | Skirius et al. |
| 7,730,928 B2 | 6/2010 | Stone et al. |
| 7,735,149 B2 | 6/2010 | Jarvis |
| 7,736,688 B2 | 6/2010 | Oetjen et al. |
| 7,737,061 B2 | 6/2010 | Chang et al. |
| 7,737,215 B2 | 6/2010 | Chang et al. |
| 7,737,324 B2 | 6/2010 | LaVon et al. |
| 7,740,469 B2 | 6/2010 | Cancio et al. |
| 7,740,786 B2 | 6/2010 | Gerndt et al. |
| 7,744,577 B2 | 6/2010 | Otsubo et al. |
| 7,744,807 B2 | 6/2010 | Berrigan et al. |
| 7,754,257 B2 | 7/2010 | Matsumoto et al. |
| 7,754,939 B2 | 7/2010 | Yoshida et al. |
| 7,757,809 B2 | 7/2010 | Pfaffelhuber et al. |
| 7,758,947 B2 | 7/2010 | Maschino et al. |
| 7,759,788 B2 | 7/2010 | Aoki et al. |
| 7,763,002 B2 | 7/2010 | Otsubo |
| 7,763,004 B2 | 7/2010 | Beck et al. |
| 7,763,061 B2 | 7/2010 | Schorr et al. |
| 7,772,137 B2 | 8/2010 | Jones |
| 7,772,139 B2 | 8/2010 | Chandra |
| 7,775,170 B2 | 8/2010 | Zafiroglu |
| 7,776,020 B2 | 8/2010 | Kaufman et al. |
| 7,776,416 B2 | 8/2010 | Kinard et al. |
| 7,777,156 B2 | 8/2010 | Rock et al. |
| 7,781,046 B2 | 8/2010 | Kalkanoglu et al. |
| 7,781,051 B2 | 8/2010 | Burr et al. |
| 7,781,069 B2 | 8/2010 | Ahmed et al. |
| 7,781,353 B2 | 8/2010 | Snowden et al. |
| 7,785,106 B2 | 8/2010 | Takahashi |
| 7,785,307 B2 | 8/2010 | Wennerback |
| 7,786,028 B2 | 8/2010 | Souther et al. |
| 7,786,032 B2 | 8/2010 | Zhou et al. |
| 7,786,034 B2 | 8/2010 | Armantrout et al. |
| 7,786,340 B2 | 8/2010 | Gagliardi et al. |
| 7,786,341 B2 | 8/2010 | Schneider et al. |
| 7,789,482 B2 | 9/2010 | Ishihara |
| 7,790,641 B2 | 9/2010 | Baker, Jr. et al. |
| 7,794,486 B2 | 9/2010 | Quincy, III |
| 7,794,737 B2 | 9/2010 | Fish et al. |
| 7,794,819 B2 | 9/2010 | Black et al. |
| 7,795,366 B2 | 9/2010 | Yang et al. |
| 7,799,175 B2 | 9/2010 | Hansen |
| 7,799,431 B2 | 9/2010 | Corzani et al. |
| 7,803,244 B2 | 9/2010 | Siqueira et al. |
| 7,803,446 B2 | 9/2010 | Martz |
| 7,803,728 B2 | 9/2010 | Poon et al. |
| 7,805,907 B2 | 10/2010 | Bletsos et al. |
| 7,806,883 B2 | 10/2010 | Fossum et al. |
| 7,807,593 B2 | 10/2010 | Patel et al. |
| 7,811,949 B2 | 10/2010 | Snowden et al. |
| 7,811,950 B2 | 10/2010 | Greiser et al. |
| 7,812,214 B2 | 10/2010 | Koele et al. |
| 7,813,108 B2 | 10/2010 | Liu et al. |
| 7,816,285 B2 | 10/2010 | MacDonald et al. |
| 7,819,852 B2 | 10/2010 | Feller et al. |

(56) References Cited

U.S. PATENT DOCUMENTS

| | | |
|---|---|---|
| 7,819,853 B2 | 10/2010 | Desai et al. |
| 7,820,562 B2 | 10/2010 | Flat et al. |
| 7,820,574 B2 | 10/2010 | Ashida et al. |
| 7,823,355 B1 | 11/2010 | Hohmann, Jr. |
| 7,824,762 B2 | 11/2010 | Ziegler |
| 7,825,045 B1 | 11/2010 | Wagner et al. |
| 7,825,050 B2 | 11/2010 | Wilfong et al. |
| 7,826,198 B2 | 11/2010 | Jiang et al. |
| 7,826,199 B2 | 11/2010 | Liu et al. |
| 7,828,922 B2 | 11/2010 | Kronzer |
| 7,829,099 B2 | 11/2010 | Woeller et al. |
| 7,829,484 B2 | 11/2010 | Sharma et al. |
| 7,829,485 B2 | 11/2010 | Mikura |
| 7,829,486 B2 | 11/2010 | Nobuto et al. |
| 7,833,211 B2 | 11/2010 | Mansfield |
| 7,837,009 B2 | 11/2010 | Gross et al. |
| 7,838,099 B2 | 11/2010 | Curro et al. |
| 7,838,104 B2 | 11/2010 | Chen et al. |
| 7,838,123 B2 | 11/2010 | Chen et al. |
| 7,841,321 B2 | 11/2010 | Kosugi et al. |
| 7,842,630 B2 | 11/2010 | Morton et al. |
| 7,846,282 B2 | 12/2010 | Nishio et al. |
| 7,850,809 B2 | 12/2010 | Schneider et al. |
| 7,854,817 B2 | 12/2010 | Thompson |
| 7,857,801 B2 | 12/2010 | Hamall et al. |
| 7,858,706 B2 | 12/2010 | Arriola et al. |
| 7,861,763 B2 | 1/2011 | Leist et al. |
| 7,862,549 B2 | 1/2011 | Desai et al. |
| 7,867,208 B2 | 1/2011 | Samuelsson et al. |
| 7,870,651 B2 | 1/2011 | Middlesworth et al. |
| 7,872,575 B2 | 1/2011 | Tabe |
| 7,875,012 B2 | 1/2011 | Arco et al. |
| 7,875,334 B2 | 1/2011 | Zafiroglu et al. |
| 7,879,452 B2 | 2/2011 | Muslet |
| 7,879,747 B2 | 2/2011 | Conrad et al. |
| 7,886,668 B2 | 2/2011 | Hugus et al. |
| 7,887,900 B2 | 2/2011 | DiPede |
| 7,887,916 B2 | 2/2011 | Kaneko |
| 7,888,545 B2 | 2/2011 | Fabo |
| 7,896,858 B2 | 3/2011 | Trennepohl et al. |
| 7,897,078 B2 | 3/2011 | Petersen et al. |
| 7,900,267 B2 | 3/2011 | Chiou |
| 7,901,390 B1 | 3/2011 | Ashton et al. |
| 7,901,392 B2 | 3/2011 | Kline et al. |
| 7,901,756 B2 | 3/2011 | Burr et al. |
| 7,901,759 B2 | 3/2011 | Burmeister et al. |
| 7,902,095 B2 | 3/2011 | Hassonjee et al. |
| 7,905,871 B2 | 3/2011 | Mueller et al. |
| 7,905,872 B2 | 3/2011 | McKiernan et al. |
| 7,910,794 B2 | 3/2011 | Quinn et al. |
| 7,910,795 B2 | 3/2011 | Thomas et al. |
| 7,914,634 B2 | 3/2011 | Moll |
| 7,914,637 B2 | 3/2011 | Pedoja |
| 7,914,723 B2 | 3/2011 | Kim et al. |
| 7,915,184 B2 | 3/2011 | Ellis et al. |
| 7,915,477 B2 | 3/2011 | Shimada et al. |
| 7,917,985 B2 | 4/2011 | Dorsey et al. |
| 7,918,313 B2 | 4/2011 | Gross et al. |
| 7,918,838 B2 | 4/2011 | Minato et al. |
| 7,919,420 B2 | 4/2011 | Bornemann et al. |
| 7,919,480 B2 | 4/2011 | Liu et al. |
| 7,923,035 B2 | 4/2011 | Ii et al. |
| 7,923,391 B2 | 4/2011 | Thomas |
| 7,923,392 B2 | 4/2011 | Thomas |
| 7,927,323 B2 | 4/2011 | Mizutani et al. |
| 7,928,282 B2 | 4/2011 | Dibb et al. |
| 7,931,944 B2 | 4/2011 | Snowden et al. |
| 7,932,196 B2 | 4/2011 | McCormack et al. |
| 7,934,521 B1 | 5/2011 | Busse et al. |
| 7,935,099 B2 | 5/2011 | Sue et al. |
| 7,935,207 B2 | 5/2011 | Zhao et al. |
| 7,935,234 B2 | 5/2011 | Mett |
| 7,935,540 B2 | 5/2011 | Kalgutkar et al. |
| 7,935,647 B2 | 5/2011 | Howard, Jr. et al. |
| 7,935,859 B2 | 5/2011 | Roe et al. |
| 7,935,861 B2 | 5/2011 | Suzuki |
| 7,937,777 B2 | 5/2011 | Sakaguchi et al. |
| 7,938,921 B2 | 5/2011 | Ng et al. |
| 7,943,051 B2 | 5/2011 | Dieziger |
| 7,943,537 B2 | 5/2011 | Vincent et al. |
| 7,947,027 B2 | 5/2011 | VanDenBogart et al. |
| 7,947,147 B2 | 5/2011 | Boermann et al. |
| 7,947,358 B2 | 5/2011 | Kling |
| 7,947,367 B2 | 5/2011 | Poon et al. |
| 7,950,385 B2 | 5/2011 | Ohnishi et al. |
| 7,951,313 B2 | 5/2011 | Matsubayashi et al. |
| 7,951,732 B2 | 5/2011 | Dharmarajan et al. |
| 7,955,457 B2 | 6/2011 | Middlesworth et al. |
| 7,956,754 B2 | 6/2011 | Long |
| 7,959,618 B2 | 6/2011 | Hermansson et al. |
| 7,959,619 B2 | 6/2011 | Cartier et al. |
| 7,959,624 B2 | 6/2011 | Riesinger |
| 7,959,751 B2 | 6/2011 | Hanson et al. |
| 7,963,363 B2 | 6/2011 | Niwa et al. |
| 7,964,161 B2 | 6/2011 | Kadel et al. |
| 7,967,804 B2 | 6/2011 | Ishikawa |
| 7,968,025 B2 | 6/2011 | Pedoja |
| 7,968,479 B2 | 6/2011 | Welch et al. |
| 7,968,656 B2 | 6/2011 | Andjelic et al. |
| 7,971,526 B2 | 7/2011 | Blenke et al. |
| 7,972,692 B2 | 7/2011 | Chakravarty et al. |
| 7,972,981 B2 | 7/2011 | Anderson et al. |
| 7,975,650 B2 | 7/2011 | Vicari et al. |
| 7,976,523 B2 | 7/2011 | Suzuki et al. |
| 7,976,662 B2 | 7/2011 | Thomas et al. |
| 7,976,764 B2 | 7/2011 | Schlemmer et al. |
| 7,977,608 B2 | 7/2011 | Diemer et al. |
| 7,979,946 B2 | 7/2011 | Kister et al. |
| 7,981,177 B2 | 7/2011 | Ogale |
| 7,981,226 B2 | 7/2011 | Pourdeyhimi et al. |
| 7,981,231 B2 | 7/2011 | Schneider et al. |
| 7,981,336 B2 | 7/2011 | Pourdeyhimi |
| 7,982,090 B2 | 7/2011 | Snauwaert et al. |
| 7,982,355 B2 | 7/2011 | Takizawa et al. |
| 7,984,591 B2 | 7/2011 | Cashin et al. |
| 7,985,210 B2 | 7/2011 | Ashton et al. |
| 7,988,824 B2 | 8/2011 | Shannon et al. |
| 7,989,062 B2 | 8/2011 | Chakravarty et al. |
| 2001/0011666 A1 | 8/2001 | Lori et al. |
| 2002/0004350 A1 | 1/2002 | Morman et al. |
| 2002/0019187 A1 | 2/2002 | Carroll et al. |
| 2002/0066522 A1 | 6/2002 | Nickel et al. |
| 2002/0074691 A1 | 6/2002 | Mortellite et al. |
| 2002/0089087 A1 | 7/2002 | Mushaben |
| 2002/0094742 A1 | 7/2002 | Jones et al. |
| 2002/0105110 A1 | 8/2002 | Dobrin et al. |
| 2002/0106959 A1 | 8/2002 | Huffines et al. |
| 2002/0112809 A1 | 8/2002 | Mortellite et al. |
| 2002/0132547 A1 | 9/2002 | Grondin et al. |
| 2002/0143306 A1 | 10/2002 | Tucker et al. |
| 2002/0150704 A1 | 10/2002 | Baer et al. |
| 2002/0179255 A1 | 12/2002 | Leist et al. |
| 2003/0047271 A1 | 3/2003 | Wu et al. |
| 2003/0106560 A1 | 6/2003 | Griesbach et al. |
| 2003/0153226 A1 | 8/2003 | Jones et al. |
| 2003/0175504 A1 | 9/2003 | Mientus et al. |
| 2004/0016502 A1 | 1/2004 | Jones |
| 2004/0023585 A1 | 2/2004 | Carroll et al. |
| 2004/0029467 A1 | 2/2004 | Lacroix |
| 2004/0029469 A1 | 2/2004 | Anderson et al. |
| 2004/0087235 A1 | 5/2004 | Morman et al. |
| 2004/0115458 A1 | 6/2004 | Kong |
| 2004/0142621 A1 | 7/2004 | Carroll et al. |
| 2004/0224596 A1 | 11/2004 | Mathis et al. |
| 2004/0253892 A1 | 12/2004 | Baker et al. |
| 2005/0054779 A1 | 3/2005 | Zhou |
| 2005/0054780 A1 | 3/2005 | Zhou et al. |
| 2005/0089682 A1 | 4/2005 | Su et al. |
| 2005/0175805 A1* | 8/2005 | Hild et al. ............ 428/36.1 |
| 2005/0176331 A1* | 8/2005 | Martin et al. ........... 442/396 |
| 2005/0227086 A1 | 10/2005 | Murphy |
| 2006/0008643 A1* | 1/2006 | Lin et al. ............... 428/364 |
| 2006/0102295 A1 | 5/2006 | Leist et al. |
| 2006/0147716 A1 | 7/2006 | Braverman et al. |

(56) References Cited

U.S. PATENT DOCUMENTS

| | | |
|---|---|---|
| 2006/0160453 A1 | 7/2006 | Suh |
| 2006/0162875 A1 | 7/2006 | Magill et al. |
| 2006/0257652 A1 | 11/2006 | Su |
| 2007/0178784 A1 | 8/2007 | Jones et al. |
| 2007/0275618 A1 | 11/2007 | Lorentz et al. |
| 2008/0131676 A1 | 6/2008 | Becke et al. |
| 2008/0155913 A1 | 7/2008 | Magill |
| 2008/0166533 A1 | 7/2008 | Jones et al. |
| 2008/0227353 A1 | 9/2008 | Klingelhage et al. |
| 2008/0228159 A1 | 9/2008 | Anderson et al. |
| 2008/0276495 A1 | 11/2008 | Jones |
| 2009/0092816 A1 | 4/2009 | Flat et al. |
| 2009/0107047 A1 | 4/2009 | Magill et al. |
| 2009/0157021 A1 | 6/2009 | Sullivan et al. |
| 2009/0191780 A1 | 7/2009 | Schiffer et al. |
| 2009/0193716 A1 | 8/2009 | Magill et al. |
| 2009/0258210 A1 | 10/2009 | Iyad et al. |
| 2009/0286023 A1* | 11/2009 | Dobreski et al. ............ 428/34.8 |
| 2009/0293404 A1 | 12/2009 | Belt et al. |
| 2009/0294034 A1 | 12/2009 | Thompson |
| 2009/0295014 A1 | 12/2009 | Matsubayashi et al. |
| 2009/0297815 A1 | 12/2009 | Higuchi et al. |
| 2009/0298372 A1 | 12/2009 | Chou et al. |
| 2009/0298374 A1 | 12/2009 | Delmas |
| 2009/0299314 A1 | 12/2009 | Middlesworth et al. |
| 2009/0299316 A1 | 12/2009 | Seyler |
| 2009/0300832 A1 | 12/2009 | Howard, Jr. |
| 2009/0301022 A1 | 12/2009 | Rockwell et al. |
| 2009/0304225 A1 | 12/2009 | Kamimura et al. |
| 2009/0304759 A1 | 12/2009 | Howard, Jr. |
| 2009/0305035 A1 | 12/2009 | Kaneko |
| 2009/0305038 A1 | 12/2009 | Duran et al. |
| 2009/0305592 A1 | 12/2009 | Shi et al. |
| 2009/0306616 A1 | 12/2009 | Wennerbaeck |
| 2009/0308524 A1 | 12/2009 | Gunji et al. |
| 2009/0308548 A1 | 12/2009 | Tramontina et al. |
| 2009/0312507 A1 | 12/2009 | Standaert et al. |
| 2009/0312731 A1 | 12/2009 | Steindl et al. |
| 2009/0312734 A1 | 12/2009 | LaVon et al. |
| 2009/0312738 A1 | 12/2009 | LaVon et al. |
| 2009/0315389 A1 | 12/2009 | Seradarian et al. |
| 2009/0317611 A1 | 12/2009 | Mueller et al. |
| 2009/0318843 A1 | 12/2009 | Van Holten et al. |
| 2009/0320718 A1 | 12/2009 | Hierse et al. |
| 2009/0323300 A1 | 12/2009 | Fujimoto et al. |
| 2009/0324893 A1 | 12/2009 | Soeder et al. |
| 2009/0324905 A1 | 12/2009 | Welch et al. |
| 2009/0325440 A1 | 12/2009 | Thomas et al. |
| 2009/0325447 A1 | 12/2009 | Austin et al. |
| 2009/0325448 A1 | 12/2009 | Welch et al. |
| 2009/0326429 A1 | 12/2009 | Siniaguine |
| 2009/0326499 A1 | 12/2009 | Veith et al. |
| 2009/0326503 A1 | 12/2009 | Lakso et al. |
| 2010/0000170 A1 | 1/2010 | Parks |
| 2010/0000599 A1 | 1/2010 | Greulich-Weber et al. |
| 2010/0003882 A1 | 1/2010 | Sumi et al. |
| 2010/0004613 A1 | 1/2010 | Cohen |
| 2010/0004615 A1 | 1/2010 | Boissier |
| 2010/0010462 A1 | 1/2010 | Kurata |
| 2010/0010598 A1 | 1/2010 | Igaki et al. |
| 2010/0012214 A1 | 1/2010 | Kamiyama et al. |
| 2010/0014164 A1 | 1/2010 | O'Brien |
| 2010/0019416 A1 | 1/2010 | Pfaffelhuber et al. |
| 2010/0023099 A1 | 1/2010 | Hidaka et al. |
| 2010/0024136 A1 | 2/2010 | Takenoiri et al. |
| 2010/0024329 A1 | 2/2010 | Gray et al. |
| 2010/0025888 A1 | 2/2010 | Bader et al. |
| 2010/0028595 A1 | 2/2010 | Backer et al. |
| 2010/0029158 A1 | 2/2010 | Kamiyama et al. |
| 2010/0029161 A1 | 2/2010 | Pourdeyhimi |
| 2010/0029455 A1 | 2/2010 | Skopek et al. |
| 2010/0029871 A1 | 2/2010 | Crowther et al. |
| 2010/0030176 A1 | 2/2010 | Beckert et al. |
| 2010/0032089 A1 | 2/2010 | Spies et al. |
| 2010/0032234 A1 | 2/2010 | Niwa et al. |
| 2010/0035014 A1 | 2/2010 | Hammons et al. |
| 2010/0035498 A1 | 2/2010 | Lundmark et al. |
| 2010/0036339 A1 | 2/2010 | Hammons et al. |
| 2010/0036347 A1 | 2/2010 | Hammons et al. |
| 2010/0036349 A1 | 2/2010 | Hammons et al. |
| 2010/0040659 A1 | 2/2010 | Fahland et al. |
| 2010/0040826 A1 | 2/2010 | Autran et al. |
| 2010/0041293 A1 | 2/2010 | Anderson et al. |
| 2010/0041295 A1 | 2/2010 | Malz et al. |
| 2010/0042062 A1 | 2/2010 | Fernkvist et al. |
| 2010/0044075 A1 | 2/2010 | Weiss et al. |
| 2010/0047326 A1 | 2/2010 | Castel et al. |
| 2010/0047518 A1 | 2/2010 | Husemann et al. |
| 2010/0047533 A1 | 2/2010 | Almansa et al. |
| 2010/0049148 A1 | 2/2010 | Siniaguine |
| 2010/0051495 A1 | 3/2010 | Guelzow et al. |
| 2010/0055273 A1 | 3/2010 | Chen |
| 2010/0055276 A1 | 3/2010 | Chen |
| 2010/0056896 A1 | 3/2010 | Park |
| 2010/0057028 A1 | 3/2010 | Catalan |
| 2010/0057032 A1 | 3/2010 | Hardegree |
| 2010/0057034 A1 | 3/2010 | Dennis et al. |
| 2010/0062231 A1 | 3/2010 | Abed et al. |
| 2010/0063468 A1 | 3/2010 | Lehto et al. |
| 2010/0064491 A1 | 3/2010 | Dumas et al. |
| 2010/0066121 A1 | 3/2010 | Gross |
| 2010/0068426 A1 | 3/2010 | Kuboyama et al. |
| 2010/0068484 A1 | 3/2010 | Kaufman |
| 2010/0069864 A1 | 3/2010 | Berland et al. |
| 2010/0069870 A1 | 3/2010 | Cohen |
| 2010/0069873 A1 | 3/2010 | Elfsberg et al. |
| 2010/0071356 A1 | 3/2010 | Tabata |
| 2010/0075103 A1 | 3/2010 | Miyamoto |
| 2010/0075561 A1 | 3/2010 | Burrow et al. |
| 2010/0076390 A1 | 3/2010 | Norrby et al. |
| 2010/0080968 A1 | 4/2010 | Mizuno et al. |
| 2010/0086719 A1 | 4/2010 | Deiss |
| 2010/0089264 A1 | 4/2010 | Warner |
| 2010/0089899 A1 | 4/2010 | Doehring et al. |
| 2010/0092726 A1 | 4/2010 | Schuette et al. |
| 2010/0093596 A1 | 4/2010 | Tadrowski |
| 2010/0094240 A9 | 4/2010 | Desai et al. |
| 2010/0095846 A1 | 4/2010 | Skirius et al. |
| 2010/0096074 A1 | 4/2010 | Schoenbeck et al. |
| 2010/0098919 A1 | 4/2010 | Hartgrove et al. |
| 2010/0100068 A1 | 4/2010 | Rodriguez et al. |
| 2010/0104830 A1 | 4/2010 | Jaeger et al. |
| 2010/0105274 A1 | 4/2010 | Haubruge et al. |
| 2010/0105833 A1 | 4/2010 | Keller et al. |
| 2010/0106121 A1 | 4/2010 | Holm |
| 2010/0107452 A1 | 5/2010 | Baychar |
| 2010/0108287 A1 | 5/2010 | Ota et al. |
| 2010/0109193 A1 | 5/2010 | Tsai et al. |
| 2010/0111335 A1 | 5/2010 | Lee et al. |
| 2010/0111889 A1 | 5/2010 | Marsh et al. |
| 2010/0112199 A1 | 5/2010 | McClure et al. |
| 2010/0112273 A1 | 5/2010 | Pedoja |
| 2010/0112301 A1 | 5/2010 | Powers |
| 2010/0119564 A1 | 5/2010 | Kasuga et al. |
| 2010/0119788 A1 | 5/2010 | Wachs et al. |
| 2010/0119988 A1 | 5/2010 | Fukuhara |
| 2010/0120313 A1 | 5/2010 | Bohme et al. |
| 2010/0120314 A1 | 5/2010 | Johnson et al. |
| 2010/0120315 A1 | 5/2010 | Imashiro et al. |
| 2010/0129426 A1 | 5/2010 | Tanaka et al. |
| 2010/0129576 A1 | 5/2010 | Zhang et al. |
| 2010/0130086 A1 | 5/2010 | Dorsey et al. |
| 2010/0130907 A1 | 5/2010 | Linkel |
| 2010/0130951 A1 | 5/2010 | Pierson et al. |
| 2010/0130952 A1 | 5/2010 | Murai |
| 2010/0130956 A1 | 5/2010 | Wennerback |
| 2010/0136073 A1 | 6/2010 | Preuss et al. |
| 2010/0136077 A1 | 6/2010 | Bukshpan et al. |
| 2010/0136865 A1 | 6/2010 | Bletsos |
| 2010/0137141 A1 | 6/2010 | Lipinsky et al. |
| 2010/0137902 A1 | 6/2010 | Lee et al. |
| 2010/0137903 A1 | 6/2010 | Lee et al. |
| 2010/0139195 A1 | 6/2010 | Tinianov et al. |
| 2010/0139877 A1 | 6/2010 | Black et al. |

(56) References Cited

U.S. PATENT DOCUMENTS

| | | |
|---|---|---|
| 2010/0143670 A1 | 6/2010 | Baldauf et al. |
| 2010/0143684 A1 | 6/2010 | Geel et al. |
| 2010/0146679 A1 | 6/2010 | Heil |
| 2010/0146851 A1 | 6/2010 | Schemeley |
| 2010/0147621 A1 | 6/2010 | Gillette |
| 2010/0148183 A1 | 6/2010 | Ward et al. |
| 2010/0150479 A1 | 6/2010 | Smith |
| 2010/0151352 A1 | 6/2010 | Haring et al. |
| 2010/0152692 A1 | 6/2010 | Ong et al. |
| 2010/0155284 A1 | 6/2010 | Gerstle et al. |
| 2010/0159050 A1 | 6/2010 | Huang et al. |
| 2010/0159197 A1 | 6/2010 | Ferguson et al. |
| 2010/0159203 A1 | 6/2010 | Shi et al. |
| 2010/0159207 A1 | 6/2010 | Schmidt |
| 2010/0159611 A1 | 6/2010 | Song et al. |
| 2010/0159769 A1 | 6/2010 | MacDonald et al. |
| 2010/0159772 A1 | 6/2010 | Ashida et al. |
| 2010/0159776 A1 | 6/2010 | Jones et al. |
| 2010/0159777 A1 | 6/2010 | Wang et al. |
| 2010/0160885 A1 | 6/2010 | Cohen |
| 2010/0163161 A1 | 7/2010 | Gilgenbach et al. |
| 2010/0163162 A1 | 7/2010 | Schneider et al. |
| 2010/0168704 A1 | 7/2010 | Thomas et al. |
| 2010/0168705 A1 | 7/2010 | Stabelfeldt et al. |
| 2010/0168706 A1 | 7/2010 | Vasic et al. |
| 2010/0172946 A1 | 7/2010 | Song et al. |
| 2010/0173993 A1 | 7/2010 | Sawyer et al. |
| 2010/0175354 A1 | 7/2010 | Mizukami et al. |
| 2010/0178268 A1 | 7/2010 | Bukshpan et al. |
| 2010/0178478 A1 | 7/2010 | Bae et al. |
| 2010/0178822 A1 | 7/2010 | Ketzer et al. |
| 2010/0179469 A1 | 7/2010 | Hammond et al. |
| 2010/0180558 A1 | 7/2010 | Ito et al. |
| 2010/0183883 A1 | 7/2010 | Schaefer et al. |
| 2010/0184348 A1 | 7/2010 | McAmish et al. |
| 2010/0189540 A1 | 7/2010 | Hancock-Cooke et al. |
| 2010/0190405 A1 | 7/2010 | Takebe et al. |
| 2010/0191198 A1 | 7/2010 | Heagle |
| 2010/0191213 A1 | 7/2010 | O'Connell |
| 2010/0196653 A1 | 8/2010 | Curro et al. |
| 2010/0197027 A1 | 8/2010 | Zhang et al. |
| 2010/0198172 A1 | 8/2010 | Wada et al. |
| 2010/0198177 A1 | 8/2010 | Yahiaoui et al. |
| 2010/0199552 A1 | 8/2010 | Weder |
| 2010/0201024 A1 | 8/2010 | Gibson et al. |
| 2010/0202143 A1 | 8/2010 | Ruehlemann et al. |
| 2010/0203638 A1 | 8/2010 | Adachi et al. |
| 2010/0204411 A1 | 8/2010 | Erneta et al. |
| 2010/0204786 A1 | 8/2010 | Foulkes |
| 2010/0206763 A1 | 8/2010 | Adeline et al. |
| 2010/0206817 A1 | 8/2010 | Dieziger |
| 2010/0209650 A1 | 8/2010 | Schlueter |
| 2010/0209667 A1 | 8/2010 | Mitsuno et al. |
| 2010/0209679 A1 | 8/2010 | Tompkins |
| 2010/0209687 A1 | 8/2010 | Zhu |
| 2010/0209784 A1 | 8/2010 | Yamazaki et al. |
| 2010/0211034 A1 | 8/2010 | Fish et al. |
| 2010/0211036 A1 | 8/2010 | Otsubo |
| 2010/0215908 A1 | 8/2010 | Kline et al. |
| 2010/0215913 A1 | 8/2010 | Kline et al. |
| 2010/0215914 A1 | 8/2010 | Kline et al. |
| 2010/0215923 A1 | 8/2010 | Frost |
| 2010/0215924 A1 | 8/2010 | Di Pede |
| 2010/0217216 A1 | 8/2010 | Sue et al. |
| 2010/0217217 A1 | 8/2010 | Kline et al. |
| 2010/0217218 A1 | 8/2010 | Baeck et al. |
| 2010/0217219 A1 | 8/2010 | Kline et al. |
| 2010/0217220 A1 | 8/2010 | Kline et al. |
| 2010/0217221 A1 | 8/2010 | Kline et al. |
| 2010/0217222 A1 | 8/2010 | Kline et al. |
| 2010/0219138 A1 | 9/2010 | Scheerlinck et al. |
| 2010/0219561 A1 | 9/2010 | Pfaffelhuber et al. |
| 2010/0221496 A1 | 9/2010 | de Jong |
| 2010/0221515 A1 | 9/2010 | Schroer |
| 2010/0221522 A1 | 9/2010 | Mrozinski |
| 2010/0221965 A1 | 9/2010 | Katayama et al. |
| 2010/0222759 A1 | 9/2010 | Hammons et al. |
| 2010/0222761 A1 | 9/2010 | Westwood et al. |
| 2010/0223715 A1 | 9/2010 | Lyons |
| 2010/0223716 A1 | 9/2010 | Howard, Jr. |
| 2010/0224199 A1 | 9/2010 | Smith et al. |
| 2010/0228204 A1 | 9/2010 | Beatty et al. |
| 2010/0228212 A1 | 9/2010 | Desai et al. |
| 2010/0228213 A1 | 9/2010 | Berland et al. |
| 2010/0228214 A1 | 9/2010 | Bornemann et al. |
| 2010/0233927 A1 | 9/2010 | Standaert et al. |
| 2010/0234823 A1 | 9/2010 | Morita et al. |
| 2010/0236492 A1 | 9/2010 | Calabrese |
| 2010/0236740 A1 | 9/2010 | Mourad et al. |
| 2010/0239814 A1 | 9/2010 | Mourad et al. |
| 2010/0239844 A1 | 9/2010 | Teather |
| 2010/0243151 A1 | 9/2010 | Stokes |
| 2010/0243500 A1 | 9/2010 | McConnell et al. |
| 2010/0247825 A1 | 9/2010 | Wood et al. |
| 2010/0247826 A1 | 9/2010 | Wood et al. |
| 2010/0247855 A1 | 9/2010 | Bletsos et al. |
| 2010/0247882 A1 | 9/2010 | Hill et al. |
| 2010/0251466 A1 | 10/2010 | Langley et al. |
| 2010/0254636 A1 | 10/2010 | Elkhouli |
| 2010/0255048 A1 | 10/2010 | Schmidt |
| 2010/0261398 A1 | 10/2010 | Dry et al. |
| 2010/0262102 A1 | 10/2010 | Turner et al. |
| 2010/0262103 A1 | 10/2010 | Turner et al. |
| 2010/0262105 A1 | 10/2010 | Turner et al. |
| 2010/0262107 A1 | 10/2010 | Turner et al. |
| 2010/0262109 A1 | 10/2010 | Eriksson |
| 2010/0262110 A1 | 10/2010 | Lakso |
| 2010/0263152 A1 | 10/2010 | Wildeman |
| 2010/0263565 A1 | 10/2010 | Hugus, IV et al. |
| 2010/0263820 A1 | 10/2010 | Kockritz et al. |
| 2010/0266835 A1 | 10/2010 | Conboy |
| 2010/0267299 A1 | 10/2010 | Anderle et al. |
| 2010/0267301 A1 | 10/2010 | Servante et al. |
| 2010/0268144 A1 | 10/2010 | Lu et al. |
| 2010/0269236 A1 | 10/2010 | Wagner et al. |
| 2010/0269241 A1 | 10/2010 | Baychar |
| 2010/0272938 A1 | 10/2010 | Mitchell et al. |
| 2010/0273375 A1 | 10/2010 | Teschner et al. |
| 2010/0273380 A1 | 10/2010 | Chen et al. |
| 2010/0273383 A1 | 10/2010 | Barney et al. |
| 2010/0274211 A1 | 10/2010 | Beck et al. |
| 2010/0279173 A1 | 11/2010 | Hying et al. |
| 2010/0279571 A1 | 11/2010 | Poon et al. |
| 2010/0280471 A1 | 11/2010 | Shah |
| 2010/0280532 A1 | 11/2010 | Gingras |
| 2010/0282682 A1 | 11/2010 | Eaton et al. |
| 2010/0285101 A1 | 11/2010 | Moore et al. |
| 2010/0285301 A1 | 11/2010 | Dieudonne et al. |
| 2010/0285520 A1 | 11/2010 | Halverson et al. |
| 2010/0285655 A1 | 11/2010 | Sakai |
| 2010/0286644 A1 | 11/2010 | Li et al. |
| 2010/0286645 A1 | 11/2010 | MacDonald et al. |
| 2010/0288131 A1 | 11/2010 | Kilber et al. |
| 2010/0290721 A1 | 11/2010 | Marin |
| 2010/0291213 A1 | 11/2010 | Berrigan et al. |
| 2010/0291828 A1 | 11/2010 | Reches et al. |
| 2010/0292664 A1 | 11/2010 | Marin |
| 2010/0293691 A1 | 11/2010 | Chabba et al. |
| 2010/0293698 A1 | 11/2010 | Burr et al. |
| 2010/0293851 A1 | 11/2010 | Weder |
| 2010/0295881 A1 | 11/2010 | Yao et al. |
| 2010/0297411 A1 | 11/2010 | Tsai et al. |
| 2010/0298795 A1 | 11/2010 | Schneider et al. |
| 2010/0298798 A1 | 11/2010 | Lakso et al. |
| 2010/0300309 A1 | 12/2010 | Schneider |
| 2010/0304072 A1 | 12/2010 | Alvelind |
| 2010/0304080 A1 | 12/2010 | Black et al. |
| 2010/0304108 A1 | 12/2010 | Doshi et al. |
| 2010/0304111 A1 | 12/2010 | Vulpitta et al. |
| 2010/0304630 A1 | 12/2010 | Morikawa et al. |
| 2010/0305529 A1 | 12/2010 | Ashton et al. |
| 2010/0310825 A1 | 12/2010 | Kalkanoglu et al. |
| 2010/0312205 A1 | 12/2010 | Martin et al. |
| 2010/0313340 A1 | 12/2010 | Du et al. |

(56) References Cited

U.S. PATENT DOCUMENTS

| | | |
|---|---|---|
| 2010/0313753 A1 | 12/2010 | Calis et al. |
| 2010/0313759 A1 | 12/2010 | Bones |
| 2010/0314026 A1 | 12/2010 | Donovan et al. |
| 2010/0314195 A1 | 12/2010 | Bliton et al. |
| 2010/0316421 A1 | 12/2010 | Komuro |
| 2010/0316846 A1 | 12/2010 | DeJong et al. |
| 2010/0316864 A1 | 12/2010 | Yoshida |
| 2010/0317020 A1 | 12/2010 | Roscoe et al. |
| 2010/0318052 A1 | 12/2010 | Ha et al. |
| 2010/0318054 A1 | 12/2010 | Langdon et al. |
| 2010/0318055 A1 | 12/2010 | Hornung et al. |
| 2010/0323575 A1 | 12/2010 | He et al. |
| 2010/0324513 A1 | 12/2010 | Wennerbaeck |
| 2010/0324522 A1 | 12/2010 | Carstens |
| 2010/0324525 A1 | 12/2010 | Carstens |
| 2010/0325833 A1 | 12/2010 | Sauer et al. |
| 2010/0326902 A1 | 12/2010 | Midkiff et al. |
| 2010/0330288 A1 | 12/2010 | Segars et al. |
| 2010/0330860 A1 | 12/2010 | Puerkner et al. |
| 2011/0000521 A1 | 1/2011 | Tachibana |
| 2011/0003092 A1 | 1/2011 | Lovgren et al. |
| 2011/0003523 A1 | 1/2011 | Herve et al. |
| 2011/0003524 A1 | 1/2011 | Claasen et al. |
| 2011/0004139 A1 | 1/2011 | Pigg |
| 2011/0004169 A1 | 1/2011 | Smith et al. |
| 2011/0004172 A1 | 1/2011 | Eckstein et al. |
| 2011/0004180 A1 | 1/2011 | Fossum et al. |
| 2011/0009843 A1 | 1/2011 | Krook |
| 2011/0010826 A1 | 1/2011 | Kaskel |
| 2011/0011396 A1 | 1/2011 | Fang |
| 2011/0012474 A1 | 1/2011 | Levit et al. |
| 2011/0014459 A1 | 1/2011 | Hansen et al. |
| 2011/0015295 A1 | 1/2011 | Gardi et al. |
| 2011/0015605 A1 | 1/2011 | Zhang et al. |
| 2011/0017278 A1 | 1/2011 | Kalkanoglu et al. |
| 2011/0020573 A1 | 1/2011 | Chou et al. |
| 2011/0020590 A1 | 1/2011 | Yoneda et al. |
| 2011/0020619 A1 | 1/2011 | Van den Bossche et al. |
| 2011/0021102 A1 | 1/2011 | Inoue et al. |
| 2011/0021103 A1 | 1/2011 | Alper et al. |
| 2011/0024412 A1 | 2/2011 | Su et al. |
| 2011/0024940 A1 | 2/2011 | Qureshi et al. |
| 2011/0028062 A1 | 2/2011 | Chester et al. |
| 2011/0029047 A1 | 2/2011 | Maruyama et al. |
| 2011/0030883 A1 | 2/2011 | Schneider et al. |
| 2011/0033532 A1 | 2/2011 | Angel et al. |
| 2011/0033625 A1 | 2/2011 | Weichmann |
| 2011/0033658 A1 | 2/2011 | Boeykens et al. |
| 2011/0034645 A1 | 2/2011 | Standaert et al. |
| 2011/0034649 A1 | 2/2011 | Standaert et al. |
| 2011/0034787 A1 | 2/2011 | Hagino et al. |
| 2011/0039468 A1 | 2/2011 | Baldwin, Jr. et al. |
| 2011/0041274 A1 | 2/2011 | Ogale |
| 2011/0041970 A1 | 2/2011 | Chang |
| 2011/0045337 A1 | 2/2011 | Lee et al. |
| 2011/0046591 A1 | 2/2011 | Warner |
| 2011/0048636 A1 | 3/2011 | Fukuhara |
| 2011/0050202 A1 | 3/2011 | Virtanen et al. |
| 2011/0053450 A1 | 3/2011 | Baqai et al. |
| 2011/0056609 A1 | 3/2011 | Iwao et al. |
| 2011/0059037 A1 | 3/2011 | Canova et al. |
| 2011/0059666 A1 | 3/2011 | Azuma et al. |
| 2011/0059668 A1 | 3/2011 | Bieser et al. |
| 2011/0059669 A1 | 3/2011 | He et al. |
| 2011/0060413 A1 | 3/2011 | Kasuga et al. |
| 2011/0062042 A1 | 3/2011 | Boldra et al. |
| 2011/0065569 A1 | 3/2011 | Matsui et al. |
| 2011/0065573 A1 | 3/2011 | McEneany et al. |
| 2011/0066126 A1 | 3/2011 | Mansfield |
| 2011/0067797 A1 | 3/2011 | Schneider et al. |
| 2011/0070410 A1 | 3/2011 | Huang et al. |
| 2011/0073239 A1 | 3/2011 | Manning et al. |
| 2011/0076312 A1 | 3/2011 | Pokropinski, Jr. et al. |
| 2011/0076905 A1 | 3/2011 | Muessig et al. |
| 2011/0077610 A1 | 3/2011 | Kikumoto et al. |
| 2011/0079525 A1 | 4/2011 | Peck et al. |
| 2011/0081817 A1 | 4/2011 | Bieser et al. |
| 2011/0081818 A1 | 4/2011 | Bieser et al. |
| 2011/0084539 A1 | 4/2011 | Hofmann et al. |
| 2011/0086564 A1 | 4/2011 | Chou et al. |
| 2011/0086568 A1 | 4/2011 | Standaert et al. |
| 2011/0091682 A1 | 4/2011 | Holland et al. |
| 2011/0091698 A1 | 4/2011 | Zhou et al. |
| 2011/0092120 A1 | 4/2011 | Todt et al. |
| 2011/0092124 A1 | 4/2011 | Brendel et al. |
| 2011/0092606 A1 | 4/2011 | Zhou |
| 2011/0092933 A1 | 4/2011 | Canales Espinosa de los Monteros et al. |
| 2011/0092945 A1 | 4/2011 | Carstens |
| 2011/0094661 A1 | 4/2011 | Thorson |
| 2011/0098668 A1 | 4/2011 | Thorson et al. |
| 2011/0100551 A1 | 5/2011 | Muessig et al. |
| 2011/0100748 A1 | 5/2011 | Nonogi et al. |
| 2011/0104461 A1 | 5/2011 | Grubka |
| 2011/0104488 A1 | 5/2011 | Muessig et al. |
| 2011/0109014 A1 | 5/2011 | Rogers et al. |
| 2011/0111660 A1 | 5/2011 | Morino et al. |
| 2011/0114414 A1 | 5/2011 | Bliton et al. |
| 2011/0114675 A1 | 5/2011 | Kelly et al. |
| 2011/0117176 A1 | 5/2011 | Klun et al. |
| 2011/0117273 A1 | 5/2011 | Mitsuishil et al. |
| 2011/0120620 A1 | 5/2011 | Hiemeyer et al. |
| 2011/0123802 A1 | 5/2011 | Chang et al. |
| 2011/0127188 A1 | 6/2011 | Thompson et al. |
| 2011/0130062 A1 | 6/2011 | Squires |
| 2011/0130063 A1 | 6/2011 | Matsubayashi et al. |
| 2011/0130814 A1 | 6/2011 | Nagano et al. |
| 2011/0131931 A1 | 6/2011 | Weder |
| 2011/0135870 A1 | 6/2011 | Gleich et al. |
| 2011/0137274 A1 | 6/2011 | Klofta et al. |
| 2011/0139366 A1 | 6/2011 | Belt et al. |
| 2011/0139658 A1 | 6/2011 | Hird et al. |
| 2011/0143004 A1 | 6/2011 | Wood et al. |
| 2011/0143620 A1 | 6/2011 | Wu |
| 2011/0143621 A1 | 6/2011 | MacDonald et al. |
| 2011/0143623 A1 | 6/2011 | Abed et al. |
| 2011/0144603 A1 | 6/2011 | Song |
| 2011/0144608 A1 | 6/2011 | Kim et al. |
| 2011/0144609 A1 | 6/2011 | Petersen et al. |
| 2011/0146039 A1 | 6/2011 | Lin et al. |
| 2011/0147301 A1 | 6/2011 | Johnson et al. |
| 2011/0147977 A1 | 6/2011 | Sommer |
| 2011/0151060 A1 | 6/2011 | Nakagiri |
| 2011/0151185 A1 | 6/2011 | Cree |
| 2011/0151738 A1 | 6/2011 | Moore et al. |
| 2011/0152641 A1 | 6/2011 | Fernfors et al. |
| 2011/0152806 A1 | 6/2011 | Zhou et al. |
| 2011/0155141 A1 | 6/2011 | Sawyer et al. |
| 2011/0155301 A1 | 6/2011 | Gilgenbach et al. |
| 2011/0156299 A1 | 6/2011 | Chou et al. |
| 2011/0156303 A1 | 6/2011 | Chou et al. |
| 2011/0159063 A1 | 6/2011 | Ellis et al. |
| 2011/0159759 A1 | 6/2011 | MacDonald et al. |
| 2011/0159764 A1 | 6/2011 | Price et al. |
| 2011/0160526 A1 | 6/2011 | Zunker et al. |
| 2011/0160687 A1 | 6/2011 | Welch et al. |
| 2011/0160691 A1 | 6/2011 | Ng et al. |
| 2011/0160692 A1 | 6/2011 | Wilkes et al. |
| 2011/0165810 A1 | 7/2011 | Mori et al. |
| 2011/0170938 A1 | 7/2011 | Littig et al. |
| 2011/0172623 A1 | 7/2011 | Roe et al. |
| 2011/0173883 A1 | 7/2011 | Weder |
| 2011/0174317 A1 | 7/2011 | Martin |
| 2011/0174430 A1 | 7/2011 | Zhao et al. |
| 2011/0177735 A1 | 7/2011 | Tasi et al. |
| 2011/0179558 A1 | 7/2011 | Lyons |
| 2011/0179677 A1 | 7/2011 | Jessiman et al. |
| 2011/0179753 A1 | 7/2011 | Toms et al. |
| 2011/0183103 A1 | 7/2011 | Kranz et al. |
| 2011/0183109 A1 | 7/2011 | Seyler et al. |
| 2011/0183568 A1 | 7/2011 | Haubruge et al. |
| 2011/0183712 A1 | 7/2011 | Eckstein et al. |
| 2011/0184136 A1 | 7/2011 | Haubruge et al. |
| 2011/0184367 A1 | 7/2011 | Toms et al. |

(56) References Cited

U.S. PATENT DOCUMENTS

| | | | |
|---|---|---|---|
| 2011/0188907 A1 | 8/2011 | Seki | |
| 2011/0189421 A1 | 8/2011 | Sherman et al. | |
| 2011/0189463 A1 | 8/2011 | Moore et al. | |
| 2011/0189916 A1 | 8/2011 | Haubruge et al. | |
| 2012/0157598 A1* | 6/2012 | Song | C08J 5/18 524/445 |
| 2012/0168340 A1 | 7/2012 | Liang et al. | |

FOREIGN PATENT DOCUMENTS

| | | |
|---|---|---|
| EP | 1022125 | 7/2000 |
| EP | 1148082 | 10/2001 |
| EP | 1970402 | 9/2008 |
| JP | 2001105520 | 4/2001 |
| JP | 2002205363 A | 7/2002 |
| WO | 9103367 | 3/1991 |
| WO | 9112125 | 8/1991 |
| WO | 9200188 A1 | 1/1992 |
| WO | 9303098 A1 | 2/1993 |
| WO | 9420298 A1 | 9/1994 |
| WO | 9504654 | 2/1995 |
| WO | 9729909 A1 | 8/1997 |
| WO | 9829481 A1 | 7/1998 |
| WO | 9840581 A1 | 9/1998 |
| WO | 9843810 | 10/1998 |
| WO | 9914262 | 3/1999 |
| WO | 9960050 | 11/1999 |
| WO | 0023255 | 4/2000 |
| WO | 0119592 | 3/2001 |
| WO | 0166627 A1 | 9/2001 |
| WO | 03016042 | 2/2003 |
| WO | 03050167 | 6/2003 |
| WO | 2004043693 | 5/2004 |
| WO | 2005017248 | 2/2005 |
| WO | 2005051635 | 6/2005 |
| WO | 2005110713 | 11/2005 |
| WO | 2007040609 A1 | 4/2007 |
| WO | 2007081548 | 7/2007 |
| WO | 2007125506 A2 | 11/2007 |
| WO | 2007125506 A3 | 11/2007 |
| WO | 2008045881 | 4/2008 |
| WO | 2010022066 A2 | 2/2010 |

OTHER PUBLICATIONS

International Preliminary Report on Patentability, mailed Jan. 9, 2014, in International Patent Application No. PCT/US2012/043775.
International Preliminary Report on Patentability, mailed Jan. 9, 2014, in International Patent Application No. PCT/US2012/043752.
International Preliminary Report on Patentability, mailed Jan. 9, 2014, in International Patent Application No. PCT/US2012/043731.
U.S. Appl. No. 13/523,028, filed Jun. 14, 2012.
U.S. Appl. No. 13/530,425, filed Jun. 22, 2012.
U.S. Appl. No. 13/530,674, filed Jun. 22, 2012.
Lotti et al., "Rheological, Mechanical and Transport Properties of Blown Films of High Density Polyethylene Nanocomposites," European Polymer Journal, vol. 44, 2008, pp. 1346-1357.
International Search Report and Written Opinion, mailed Jan. 31, 2013, in International Patent Application No. PCT/US2012/043731.
International Search Report and Written Opinion, mailed Jan. 31, 2013, in International Patent Application No. PCT/US2012/043752.
International Search Report and Written Opinion, mailed Jan. 31, 2013, in International Patent Application No. PCT/US2012/043775.
International Search Report and Written Opinion, mailed Feb. 25, 2013, in International Patent Application No. PCT/US2012/042397.
Non-Final Office Action issued Jul. 17, 2014, in related U.S. Appl. No. 13/530,425.
Non-Final Office Action issued Jun. 20, 2014, in related U.S. Appl. No. 13/530,674.
Dai Xin et al. "Preparation and Properties of HDPE/CaCO3/OMMT Ternary Nanocomposite." Polymer Engineering and Science; May 2010; 50(5); pp. 894-899.
European Search Report issued in related EP Application No. 12802064.1-1308 on Nov. 21, 2014.

* cited by examiner

VAPOR-PERMEABLE, SUBSTANTIALLY WATER-IMPERMEABLE MULTILAYER ARTICLE

CROSS-REFERENCE TO RELATED APPLICATIONS

This application claims priority to U.S. Provisional Patent Application No. 61/500,694 filed Jun. 24, 2011, which is incorporated herein by reference in its entirety.

TECHNICAL FIELD

This disclosure relates to vapor-permeable, substantially water-impermeable multilayer articles, as well as related products and methods.

BACKGROUND

Films that allow passage of gases at moderate to high transmission rates are often called breathable. The gases most commonly used to demonstrate a film's breathability are water vapor (also referred to herein as moisture vapor or moisture) and oxygen. The moisture vapor transmission test and oxygen transmission test measure the mass or volume of a gas transported across the cross-section of a film in a given unit of time at a defined set of environmental conditions. Breathable films can be classified either as microporous films or monolithic films (which are not porous).

A breathable film can be laminated onto a nonwoven substrate to form a vapor-permeable, substantially water-impermeable multilayer article. A vapor-permeable, substantially water-impermeable multilayer article can refer to an article that allows the passage of a gas but substantially does not allow the passage of water.

SUMMARY

This disclosure is based on the unexpected findings that a polyolefin and a relatively large amount of a polymer that is immiscible with the polyolefin (also referred to hereinafter as "immiscible polymer") can be blended together to form a microporous breathable film with superior processability without using a compatibilizer. Such an article can be suitable for use as a construction material (e.g., a housewrap or a roofwrap).

In one aspect, this disclosure features an article that includes a film. The film includes first and second polymers. The first polymer includes a polyolefin. The second polymer is immiscible with the first polymer and includes a polycycloolefin, a polymethylpentene, or a copolymer thereof.

In another aspect, this disclosure features an article (e.g., a vapor-permeable, substantially water-impermeable multilayer article) that includes a nonwoven substrate and a film supported by the nonwoven substrate. The film includes first and second polymers. The first polymer includes a polyolefin. The second polymer is immiscible with the first polymer and includes a polycycloolefin, a polymethylpentene, or a copolymer thereof.

In another aspect, this disclosure features an article that includes a nonwoven substrate and a film supported by the nonwoven substrate. The film includes first and second polymers. The first polymer includes a polyolefin. The second polymer includes a polycycloolefin, a polymethylpentene, or a copolymer thereof.

In another aspect, this disclosure features a construction material that includes an article described above.

In still another aspect, this disclosure features a method of making an article. The method includes forming a nonwoven substrate and a film supported by the nonwoven substrate, and stretching the laminate to form the article. The film includes first and second polymers. The first polymer includes a polyolefin. The second polymer is immiscible with the first polymer and includes a polycycloolefin, a polymethylpentene, or a copolymer thereof.

Embodiments can include one or more of the following optional features.

The second polymer can include a poly(cycloolefin-co-olefin), such as a poly(norbornene-co-ethylene) or a copolymer formed from ethylene and norbornene substituted with a substituent (e.g., a hydrocarbon moiety such as $C_1$-$C_{20}$ alkyl).

The film can include at least about 1% by weight of the second polymer.

The first polymer can include a polyethylene or a polypropylene. The polyethylene can be selected from the group consisting of low-density polyethylene, linear low-density polyethylene, high-density polyethylene, and copolymers thereof.

The film can further include an elastomer or a nanoclay.

The film can further include a pore-forming filler (e.g., calcium carbonate). For example, the film can include from about 30% by weight to about 70% by weight of calcium carbonate.

The film can be substantially uniform in the absence of a compatibilizer.

The nonwoven substrate can include randomly disposed polymeric fibers, at least a portion of the fibers being bonded to one another.

The article can be embossed.

The article can have a moisture vapor transmission rate (MVTR) of at least about 35 $g/m^2/day$ when measured at 23° C. and 50% relative humidity (RH %).

The construction material can be a housewrap or a roofwrap.

Forming the laminate can include extruding the film onto the nonwoven substrate.

The laminate can be stretched at an elevated temperature (e.g., at least about 30° C.).

The laminate can be stretched in the machine direction or in the cross-machine direction.

The laminate can be stretched by a method selected from the group consisting of ring rolling, tentering, embossing, creping, and button-breaking.

The method can further include embossing the laminate prior to or after stretching the laminate.

The method can further include bonding randomly disposed polymeric fibers to produce the nonwoven substrate prior to forming the laminate.

Embodiments can provide one or more of the following advantages.

Without wishing to be bound by theory, it is believed that, as the immiscible polymer has a polymer backbone similar to that of the polyolefin polymer in the breathable film, a relatively large amount (e.g., at least about 30% by weight) of the immiscible polymer can be blended with the polyolefin polymer to form a microporous breathable film that is substantially uniform and has superior processability without using a compatibilizer, thereby significantly reducing the cost for manufacturing the film. By contrast, when a conventional immiscible polymer (e.g., a polystyrene) is blended with the polyolefin polymer at the same concentration level, a uniform film is generally not formed even in the presence of a compatibilizer.

Other features and advantages will be apparent from the description, drawings, and claims.

DESCRIPTION OF DRAWINGS

Like reference symbols in the various drawings indicate like elements.

DETAILED DESCRIPTION

This disclosure relates to, for example, an article (e.g., a vapor-permeable, substantially water-impermeable multilayer article) containing a nonwoven substrate and a microporous breathable film supported by the nonwoven substrate. The microporous breathable film can include a first polymer (e.g., a polyolefin) and a second polymer that is immiscible with the first polymer (e.g., a polycycloolefin, a polymethylpentene, or a copolymer thereof). The nonwoven substrate can be formed from polymeric fibers (e.g., fibers made from polyolefins).

Figure 1:
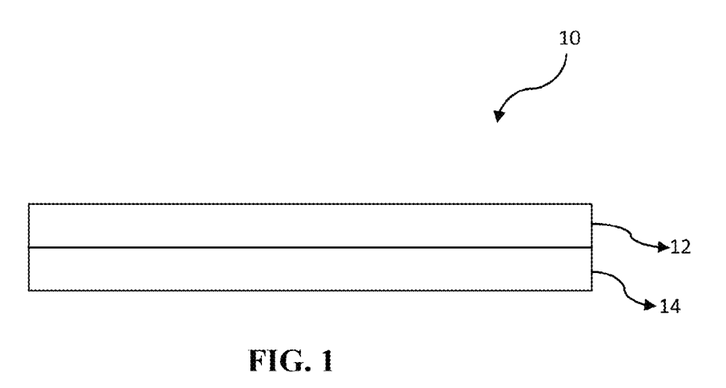
FIG. 1 is a cross-sectional view of a vapor-permeable, substantially water-impermeable multilayer article.

FIG. 1 is a cross-sectional view of a vapor-permeable, substantially water-impermeable multilayer article 10 containing a microporous breathable film 12 and a nonwoven substrate 14.

Microporous Breathable Film

Microporous breathable film 12 can include a first polymer and a second polymer immiscible with the first polymer.

In some embodiments, the first polymer includes a polyolefin. As used herein, the term "polyolefin" refers to a homopolymer or a copolymer made from a linear or branched, cyclic or acyclic alkene. Examples of polyolefins that can be used in film 12 include polyethylene, polypropylene, polybutene, polypentene, and polymethylpentene. In some embodiments, film 12 can include two or more (e.g., three, four, or five) different polyolefins.

Exemplary polyethylene suitable for film 12 include low-density polyethylene (e.g., having a density from 0.910 g/cm$^2$ to 0.925 g/cm$^2$), linear low-density polyethylene (e.g., having a density from 0.910 g/cm$^2$ to 0.935 g/cm$^2$), and high-density polyethylene (e.g., having a density from 0.935 g/cm$^2$ to 0.970 g/cm$^2$). High-density polyethylene can be produced by copolymerizing ethylene with one or more $C_4$ to $C_{20}$ α-olefin co-monomers. Examples of suitable α-olefin co-monomers include 1-butene, 1-pentene, 4-methyl-1-pentene, 1-hexene, 1-octene, 1-decene, and combinations thereof. The high-density polyethylene can include up to 20 mole percent of the above-mentioned α-olefin co-monomers. In some embodiments, the polyethylene suitable for use in film 12 can have a melt index in the range of from about 0.1 g/10 min to about 10 g/10 min (e.g., from about 0.5 g/10 min to 5 g/10 min).

Polypropylene can be used in film 12 by itself or in combination with one or more of the polyethylene polymers described above. In the latter case, polypropylene can be either copolymerized or blended with one or more polyethylene polymers. Both polyethylene and polypropylene are available from commercial sources or can be readily prepared by methods known in the art.

The amount of the first polymer in film 12 can vary depending on the desired applications. For example, the first polymer can be at least about 40% (e.g., at least about 45%, at least about 50%, at least about 55%, at least about 60%, at least about 65%, at least about 70%, or at least about 80%) and/or at most about 99% (e.g., at most about 95%, at most about 90%, at most about 85%, at most about 80%, at most about 75%, or at most about 70%) of the total weight of film 12.

The second polymer can be immiscible with the first polymer. For example, the second polymer can form phase separation when blended with the first polymer. Without wishing to be bound by theory, it is believed that using two immiscible polymers in film 12 can form pores upon stretching, which impart breathability to film 12 (i.e., allowing passage of moisture, but not water, through film 12). As such, the second polymer can serve as an organic pore-forming agent. In some embodiments, film 12 can include three or more (e.g., four or five) immiscible polymers.

Examples of suitable second polymers include a polycycloolefin, a polymethylpentene, or a copolymer thereof. The monomers that can be used to prepare polycycloolefin include non-aromatic cyclic hydrocarbons containing one or more (e.g., two or three) ring double bonds. Examples of suitable monomers include dipentene, dicyclopentadiene, alpha-terpinene, gamma-terpinene, limonene, alpha-pinene, 3-carene, norbornene, and norbornadiene. Examples of suitable polycycloolefins include poly(cycloolefin-co-olefin), such as poly(norbornene-co-ethylene) or a copolymer formed from ethylene and substituted norbornene. A commercial example of a polycycloolefin suitable for use in film 12 is APEL available from Mitsui Chemicals America, Inc. (Rye Brook, N.Y.). A commercial example of a polymethylpentene suitable for use in film 12 is TPX MX0002 available from Mitsui Chemicals America, Inc. The substituted norbornene can include those substituted with $C_1$-$C_{20}$ alkyl, $C_3$-$C_{20}$ cycloalkyl, or aryl.

The amount of the second polymer in film 12 can vary depending on the first polymer used or the intended applications. For example, the second polymer can be at least about 1% (e.g., at least about 5%, at least about 10%, at least about 15%, at least about 20%, at least about 25%, or at least about 30%) and/or at most about 60% (e.g., at most about 50%, at most about 45%, at most about 40%, at most about 35%, at most about 30%, at most about 25%, or at most about 20%) of the total weight of film 12.

Without wishing to be bound by theory, it is believed that, as the second polymer has a polymer backbone similar to that of the first polymer, a relatively large amount (e.g., at least about 5% by weight or at least about 30% by weight) of the second polymer can be blended with the first polymer to form microporous breathable film 12 that is substantially uniform and has superior processability even without using a compatibilizer, thereby significantly reducing the cost for manufacturing the film. By contrast, when a conventional immiscible polymer (e.g., a polystyrene) is blended with the first polymer (e.g., a polyolefin) at the same concentration level, a uniform film is generally not formed even in the presence of a compatibilizer.

In some embodiments, film 12 can further include a pore-forming filler (e.g., an inorganic pore-forming filler) to facilitate generation of pores upon stretching (e.g., by using a ring-rolling process during the manufacture of multilayer article 10).

The pore-forming filler can have a low affinity to and a lower elasticity than the polyolefin polymer in film 12. In some embodiments, the pore-forming filler can be a rigid material. It can have a non-smooth surface, or have a surface treated to become hydrophobic.

In some embodiments, the pore-forming filler is in the form of particles. In such embodiments, the average value of the maximum linear dimension of the filler particles can be at least about 0.5 micron (at least about 1 micron or at least about 2 microns) and/or at most about 7 microns (e.g., at most about 5 microns or at most about 3.5 microns). Without wishing to be bound by theory, it is believed that filler particles with a relatively small average value of the maximum linear dimension (e.g., from about 0.75 microns to 2 microns) can provide a better balance of compoundability and breathability than filler particles with a relatively large average value of the maximum linear dimension.

The pore-forming filler in film 12 can be any suitable inorganic or organic material, or combinations thereof. Examples of the inorganic fillers include calcium carbonate, talc, clay, kaolin, silica diatomaceous earth, magnesium carbonate, barium carbonate, magnesium sulfate, barium sulfate, calcium sulfate, aluminum hydroxide, zinc oxide, magnesium oxide, calcium oxide, magnesium oxide, titanium oxide, alumina, mica, glass powder, glass beads (hollow or non-hollow), glass fibers, zeolite, silica clay, and combinations thereof. In some embodiments, the pore-forming filler in film 16 includes calcium carbonate. In some embodiments, the inorganic pore-forming filler can be surface treated to be hydrophobic so that the filler can repel water to reduce agglomeration of the filler. In addition, the pore-forming filler can include a coating on the surface to improve binding of the filler to the polyolefin in film 12 while allowing the filler to be pulled away from the polyolefin when film 12 is stretched or oriented (e.g., during a ring-rolling process). Exemplary coating materials include stearates, such as calcium stearate. Examples of organic fillers that can be used in film 16 include wood powder, pulp powder, and other cellulose-type powders. Polymer powders such as TEFLON powder and KEVLAR powder can also be included as an organic pore-forming filler. The pore-forming fillers described above are either available from commercial sources or can be readily prepared by methods known in the art.

The amount of the pore-forming filler in film 12 can vary as desired. For example, film 12 can include from at least about 5% (e.g., at least about 10%, at least about 15%, or at least about 20%) to at most about 30% (e.g., at most about 25%, at most about 20%, or at most about 15%) by weight of the pore-forming filler (e.g., calcium carbonate).

In some embodiments, film 12 can further include a functionalized polyolefin (e.g., functionalized polyethylene or polypropylene), such as a polyolefin graft copolymer. Examples of such polyolefin graft copolymers include polypropylene-g-maleic anhydride and polymers formed by reacting PP-g-MAH with a polyetheramine. In some embodiments, such a functionalized polyolefin can be used a compatibilizer to minimize the phase separation between the components in film 12 and/or to improve adhesion between film 12 and nonwoven substrate 14. The compatibilizer can be at least about 0.1% (e.g., at least about 0.2%, at least about 0.4%, at least about 0.5%, at least about 1%, or at least about 1.5%) and/or at most about 30% (e.g., at most about 25%, at most about 20%, at most about 15%, at most about 10%, at most about 5%, at most about 4%, at most about 3%, or at most about 2%) of the total weight of film 12.

Optionally, film 12 can include an elastomer (e.g., a thermoplastic olefin elastomer) to improve the elasticity of the film. Examples of suitable elastomers include vulcanized natural rubber, ethylene alpha olefin rubber (EPM), ethylene alpha olefin diene monomer rubber (EPDM), styrene-isoprene-styrene (SIS) copolymers, styrene-butadiene-styrene (SBS) copolymers, styrene-ethylene-butylene-styrene (SEBS) copolymers, ethylene-propylene (EP) copolymers, ethylene-vinyl acetate (EVA) copolymers, ethylene-maleic anyhydride (EMA) copolymers, ethylene-acrylic acid (EEA) copolymers, and butyl rubber. A commercial example of such an elastomer is VERSIFY (i.e., an ethylene-propylene copolymer) available from Dow (Midland, Mich.). Film 12 can include from about 5% (e.g., at least about 6% or at least about 7%) to at most about 30% (e.g., at most about 25%, at most about 20%, or at most about 15%) by weight of the elastomer. Without wishing to be bound by theory, it is believed that one advantage of using an elastomer in film 12 is that multilayer article 10 containing such a film can have both improved tensile strength (e.g., by at least about 5% or at least about 10%) and improved elongation (e.g., by at least about 20% or at least about 50%).

Further, film 12 can optionally include a nanoclay (e.g., montmorillonite nanoclay). Examples of nanoclays have been described in, e.g., Provisional Application No. 61/498,328, entitled "Vapor-permeable, Substantially Water-impermeable Multilayer Article".

Nonwoven Substrate

Nonwoven substrate 14 can include randomly disposed polymeric fibers, at least some of the fibers being bonded to one another. As used herein, the term "nonwoven substrate" refers to a substrate containing one or more layers of fibers that are bonded together, but not in an identifiable manner as in a knitted or woven material.

Nonwoven substrate 14 can be formed from any suitable polymers. Exemplary polymers that can be used to form nonwoven substrate 14 include polyolefins and polyesters. Examples of suitable polyolefins include polyethylene, polypropylene, and copolymers thereof, such as those in film 12 described above. Examples of suitable polyesters include polyethylene terephthalate (PET), polybutylene terephthalate (PBT), polytrimethylene terephthalate (PTT), polyethylene naphthalate (PEN), polyglycolide or polyglycolic acid (PGA), polylactide or polylactic acid (PLA), polycaprolactone (PCL), polyethylene adipate (PEA), polyhydroxyalkanoate (PHA), and copolymers thereof.

Nonwoven substrate 14 can be formed from single component fibers, i.e., fibers containing a polymer having a single chemical structure (e.g., a polymer described in the preceding paragraph such as a polyethylene, a polypropylene, or a polyethylene terephthalate). In some embodiments, nonwoven substrate 14 can include single component fibers made from polymers having the same chemical structure but different characteristics (e.g., molecular weights, molecular weight distributions, density, or intrinsic viscosities). For example, substrate 14 can include a mixture of a low-density polyethylene and a high-density polyethylene. Such fibers are still referred to as single component fibers in this disclosure.

Nonwoven substrate 14 can also be formed from multicomponent fibers, i.e., fibers containing polymers with different chemical structures (such as two different polymers described above). For example, substrate 14 can be formed from a mixture of a polypropylene and a polyethylene terephthalate. In some embodiments, a multicomponent fiber can have a sheath-core configuration (e.g., having a polyethylene terephthalate as the core and a polypropylene as the sheath). In some embodiments, a multicomponent fiber can include two or more polymer domains in a different configuration (e.g., a side-by-side configuration, a pie configuration, or an "islands-in-the-sea" configuration).

In some embodiments, the surface of nonwoven substrate 14 can be formed of a polymer having a chemical structure similar to (e.g., the same type as) or the same as the chemical structure of a polymer in the surface of film 12. As an example, a polyolefin (e.g., a polyethylene or propylene) is of the same type as and similar to a different polyolefin (e.g., a polyethylene or propylene). Without wishing to be bound by theory, it is believed that such two layers can have improved adhesion. For example, when nonwoven substrate 14 is formed from single component fibers, the fibers can be made from a polyolefin, which has a chemical structure similar to or the same as a polyolefin that is used to make film 12. When nonwoven substrate 14 is formed of multi-component fibers (e.g., having a sheath-core configuration), the polymer (e.g., a polyolefin in the sheath) in the fibers that contacts film 12 can have a chemical structure similar to or the same as the chemical structure of a polyolefin in film 12. Both examples described above can result in a multilayer article with improved adhesion between film 12 and nonwoven substrate 14.

Nonwoven substrate 14 can be made by methods well known in the art, such as a spunlacing, spunbonding, melt-blowing, carding, air-through bonding, or calendar bonding process.

In some embodiments, nonwoven substrate 14 can be a spunbonded nonwoven substrate. In such embodiments, nonwoven substrate 14 can include a plurality of random continuous fibers, at least some (e.g., all) of which are bonded (e.g., area bonded or point bonded) with each other through a plurality of intermittent bonds. The term "continuous fiber" mentioned herein refers to a fiber formed in a continuous process and is not shortened before it is incorporated into a nonwoven substrate containing the continuous fiber.

As an example, nonwoven substrate 14 containing single component fibers can be made by using a spunbonding process as follows.

After the polymer for making single component fibers is melted, the molten polymer can be extruded from an extruding device. The molten polymer can then be directed into a spinneret with composite spinning orifices and spun through this spinneret to form continuous fibers. The fibers can subsequently be quenched (e.g., by cool air), attenuated mechanically or pneumatically (e.g., by a high velocity fluid), and collected in a random arrangement on a surface of a collector (e.g., a moving substrate such as a moving wire or belt) to form a nonwoven web. In some embodiments, a plurality of spinnerets with different quenching and attenuating capability can be used to place one or more (e.g., two, three, four, or five) layers of fibers on a collector to form a substrate containing one or more layers of spunbonded fibers (e.g., an S, SS, or SSS type of substrate). In some embodiments, one or more layers of meltblown fibers can be inserted between the layers of the above-described spunbonded fibers to form a substrate containing both spunbonded and meltblown fibers (e.g., a nSMS, SMMS, or SSMMS type of substrate).

A plurality of intermittent bonds can subsequently be formed between at least some of the fibers (e.g., all of the fibers) randomly disposed on the collector to form a unitary, coherent, nonwoven substrate. Intermittent bonds can be formed by a suitable method such as mechanical needling, thermal bonding, ultrasonic bonding, or chemical bonding. Bonds can be covalent bonds (e.g., formed by chemical bonding) or physical attachments (e.g., formed by thermal bonding). In some embodiments, intermittent bonds are formed by thermal bonding. For example, bonds can be formed by known thermal bonding techniques, such as point bonding (e.g., using calender rolls with a point bonding pattern) or area bonding (e.g., using smooth calender rolls without any pattern). Bonds can cover between about 6 and about 40 percent (e.g., between about 8 and about 30 percent or between about 22 and about 28 percent) of the total area of nonwoven substrate 14. Without wishing to be bound by theory, it is believed that forming bonds in substrate 14 within these percentage ranges allows elongation throughout the entire area of substrate 14 upon stretching while maintaining the strength and integrity of the substrate.

Optionally, the fibers in nonwoven substrate 14 can be treated with a surface-modifying composition after intermittent bonds are formed. Methods of applying a surface-modifying composition to the fibers have been described, for example, in U.S. Provisional Patent Application No. 61/294,328.

The nonwoven substrate thus formed can then be used to form multilayer article 10 described above. A nonwoven substrate containing multicomponent fibers can be made in a manner similar to that described above. Other examples of methods of making a nonwoven substrate containing multicomponent fibers have been described in, for example, U.S. Provisional Patent Application No. 61/294,328.

Method of Making Multilayer Article

Multilayer article 10 can be made by the methods known in the art or the methods described herein. For example, multilayer article 10 can be made by first applying film 12 onto nonwoven substrate 14 to form a laminate. Film 12 can be applied onto nonwoven substrate 14 by extruding (e.g., cast extrusion) a suitable composition for film 12 (e.g., a composition containing the first and second polymers described above) at an elevated temperature to form a film onto nonwoven substrate 14. In some embodiments, the just-mentioned composition can be extruded (e.g., by tubular extrusion or cast extrusion) to form a web, which can be cooled (e.g., by passing through a pair of rollers) to form a precursor film. A laminate can then be formed by attaching the precursor film to nonwoven substrate 14 by using, for example, an adhesive (e.g., a spray adhesive, a hot melt adhesive, or a latex based adhesive), thermal bonding, ultra-sonic bonding, or needle punching.

In some embodiments, multilayer article 10 can include multiple (e.g., two, three, four, or five) films supported by nonwoven substrate 14, wherein at least one of the films is film 12 described above. The additional films can be made by one or more of the materials used to prepare film 12 described above or other materials known in the art. In some embodiments, nonwoven substrate 14 can be disposed between two of the multiple films. In some embodiments, all of the films can be disposed on one side of nonwoven substrate 14.

Figure 2:
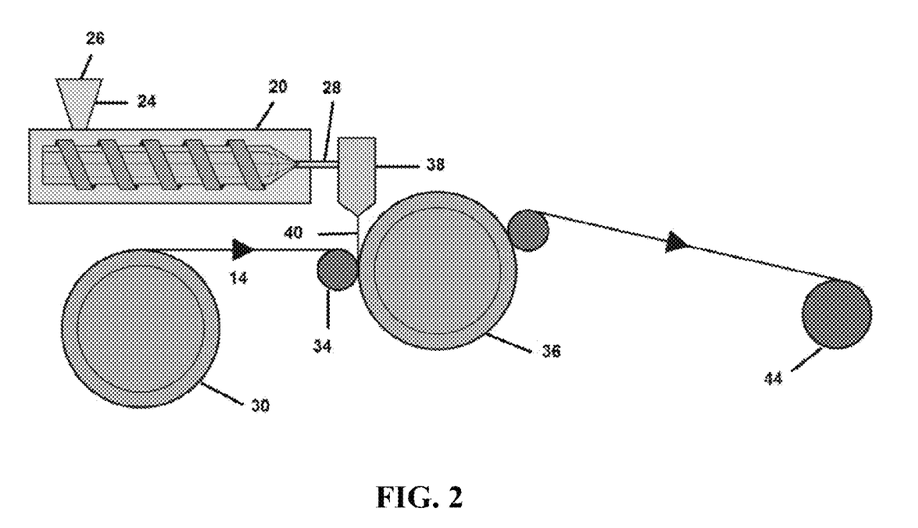
FIG. 2 is a scheme illustrating an exemplary extruding process.

FIG. 2 is a scheme illustrating an exemplary process for making a laminate described. As shown in FIG. 2, a suitable composition (e.g., a composition containing the first and second polymers described above) can be fed into an inlet 26 of an extruder hopper 24. The composition can then be melted and mixed in a screw extruder 20. The molten mixture can be discharged from extruder 20 under pressure through a heated line 28 to a flat film die 38. Extrusion melt 40 discharging from flat film die 38 can be coated on nonwoven substrate 14 from roll 30. The coated substrate can then enter a nip formed between rolls 34 and 36, which can be maintained at a suitable temperature (e.g., between about 10-120° C.). Passing the coated substrate through the nip formed between cooled rolls 34 and 36 can quench extrusion melt 40 while at the same time compressing extrusion melt 40 so that it contacts nonwoven substrate 14. In some embodiments, roll 34 can be a smooth rubber roller with a low-stick surface coating while roll 36 can be a metal roll. A textured embossing roll can be used to replace metal roll 36 if a multilayer article with a textured film layer is desired. When extrusion melt 40 is cooled, it forms film 12 laminated onto nonwoven substrate 14. The laminate thus formed can then be collected on a collection roll 44. In some embodiments, the surface of nonwoven substrate 14 can be corona or plasma treated before it is coated with extrusion melt 40 to improve the adhesion between nonwoven substrate 14 and film 12.

The laminate formed above can then be stretched (e.g., incrementally stretched or locally stretched) to form a vapor-permeable, substantially water-impermeable multilayer article 10. Without wishing to be bound by theory, it is believed that stretching the laminate generates pores between the first and second polymers in film 12 that allow air or moisture to pass through. The laminate can be stretched (e.g., incrementally stretched) in the machine direction (MD) or the cross-machine direction (CD) or both (biaxially) either simultaneously or sequentially. As used herein, "machine direction" refers to the direction of movement of a nonwoven material during its production or processing. For example, the length of a nonwoven material can be the dimension in the machine direction. As used herein, "cross-machine direction" refers to the direction that is essentially perpendicular to the machine direction defined above. For example, the width of a nonwoven material can be the dimension in the cross-machine direction. Examples of incremental stretching methods have been described in, e.g., U.S. Pat. Nos. 4,116,892 and 6,013,151.

Exemplary stretching methods include ring rolling (in the machine direction and/or the cross-machine direction), tentering, embossing, creping, and button-breaking These methods are known in the art, such as those described in U.S. Pat. No. 6,258,308 and U.S. Provisional Patent Application No. 61/294,328.

In some embodiments, the laminate described above can be stretched (e.g., incrementally stretched) at an elevated temperature as long as the polymers in the laminate maintain a sufficient mechanical strength at that temperature. The elevated temperature can be at least about 30° C. (e.g., at least about 40° C., at least about 50° C., or at least about 60° C.) and/or at most about 100° C. (e.g., at least about 90° C., at least about 80° C., or at least about 70° C.). Without wishing to be bound by theory, it is believed that stretching the laminate described above at an elevated temperature can soften the polymers in film 12 and nonwoven substrate 14, and therefore allow these polymers to be stretched easily. In addition, without wishing to be bound by theory, it is believed that stretching the laminate described above at an elevated temperature can increase the MVTR by increasing the number of the pores, rather than the size of the pores (which can reduce the hydrostatic head (i.e., resistance of water) of the multilayer article). As a result, it is believed that stretching the laminate described above at an elevated temperature can unexpectedly improve the MVTR of the resultant multilayer article while still maintaining an appropriate hydrostatic head of the multilayer article.

Figure 3:
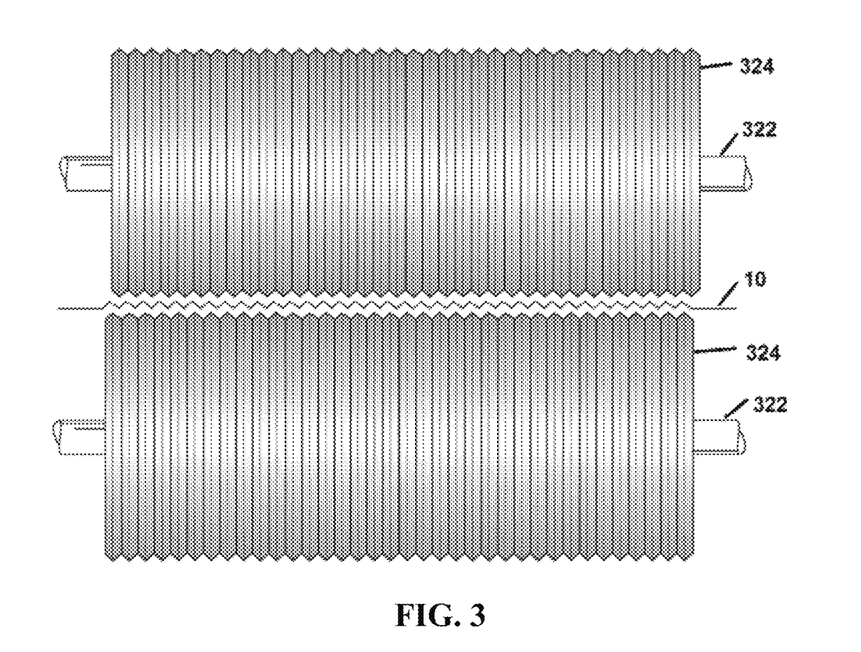
FIG. 3 is a scheme illustrating an exemplary ring-rolling apparatus.

FIG. 3 illustrates an exemplary ring-rolling apparatus 320 used to incrementally stretch the laminate described above in the cross-machine direction. Apparatus 320 includes a pair of grooved rolls 322, each including a plurality of grooves 324. The grooves 324 stretch the laminate described above to form multilayer article 10. In some embodiments, one or both of rolls 322 can be heated to an elevated temperature (e.g., between about 30° C. and about 100° C.) by passing a hot liquid through roll 322. The laminate described above can also be incrementally stretched in the machine direction in a similar manner. It is contemplated that the laminate can also be incrementally stretched using variations of the ring-rolling apparatus 320 and/or one or more other stretching apparatus known in the art.

In some embodiments, the laminate described above can be embossed prior to or after being stretched (e.g., by using a calendering process). For example, the laminate can be embossed by passing through a pair of calender rolls in which one roll has an embossed surface and the other roll has a smooth surface. Without wishing to be bound by theory, it is believed that an embossed multilayer article can have a large surface area, which can facilitate vapor transmission through the multilayer article. In some embodiments, at least one (e.g., both) of the calender rolls is heated, e.g., by circulating a hot oil through the roll.

Properties of Multilayer Article

In some embodiments, multilayer article 10 can have a suitable MVTR based on its intended uses. As used herein, the MVTR values are measured according to ASTM E96-A. For example, multilayer article 10 can have a MVTR of at least about 35 $g/m^2/day$ (e.g., at least about 50 $g/m^2/day$, at least about 75 $g/m^2/day$, or at least about 100 $g/m^2/day$) and/or at most about 140 $g/m^2/day$ (e.g., at most about 130 $g/m^2/day$, at most about 120 $g/m^2/day$, or at most about 110 $g/m^2/day$) when measured at 23° C. and 50 RH %. For instance, the multilayer article 10 can have a MVTR of between 70 $g/m^2/day$ and 140 $g/m^2/day$.

In some embodiments, multilayer article 10 can have a sufficient tensile strength in the machine direction and/or the cross-machine direction. The tensile strength is determined by measuring the tensile force required to rupture a sample of a sheet material. The tensile strength mentioned herein is measured according to ASTM D5034 and is reported in pounds. In some embodiments, multilayer article 10 can have a tensile strength of at least about 40 pounds (e.g., at least about 50 pounds, at least about 60 pounds, at least about 70 pounds, or at least about 80 pounds) and/or at most about 160 pounds (e.g., at most about 150 pounds, at most about 140 pounds, at most about 130 pounds, or at most about 120 pounds) in the machine direction. In some embodiments, multilayer article 10 can have a tensile strength of at least about 35 pounds (e.g., at least about 40 pounds, at least about 50 pounds, at least about 60 pounds, or at least about 70 pounds) and/or at most about 140 pounds (e.g., at most about 130 pounds, at most about 120 pounds, at most about 110 pounds, or at most about 100 pounds) in the cross-machine direction.

As a specific example, when multilayer article 10 has a unit weight of 1.25 ounce per square yard (osy), it can have a tensile strength of at least about 40 pounds (e.g., at least about 45 pounds, at least about 50 pounds, at least about 55 pounds, or at least about 60 pounds) and/or at most about 100 pounds (e.g., at most about 95 pounds, at most about 90 pounds, at most about 85 pounds, or at most about 80 pounds) in the machine direction, and at least about 35 pounds (e.g., at least about 40 pounds, at least about 45 pounds, at least about 50 pounds, or at least about 55 pounds) and/or at most about 95 pounds (e.g., at most about 90 pounds, at most about 85 pounds, at most about 80 pounds, or at most about 75 pounds) in the cross-machine direction.

In some embodiments, multilayer article 10 can have a sufficient elongation in the machine direction and/or the cross-machine direction. Elongation is a measure of the amount that a sample of a sheet material will stretch under tension before the sheet breaks. The term "elongation" used herein refers to the difference between the length just prior to breaking and the original sample length, and is expressed as a percentage of the original sample length. The elongation values mentioned herein are measured according to ASTM D5034. For example, multilayer article 10 can have an elongation of at least about 5% (e.g., at least about 10%, at least about 20%, at least about 30%, at least about 35%, or at least about 40%) and/or at most about 100% (e.g., at most 90%, at most about 80%, or at most about 70%) in the machine direction. As another example, multilayer article 10 can have an elongation of at least about 5% (e.g., at least about 10%, at least about 20%, at least about 30%, at least about 35%, or at least about 40%) and/or at most about 100% (e.g., at most about 90%, at most about 80%, or at most about 70%) in the cross-machine direction.

In some embodiments, multilayer article 10 can have a sufficient hydrostatic head value so as to maintain sufficient water impermeability. As used herein, the term "hydrostatic head" refers to the pressure of a column of water as measured by its height that is required to penetrate a given material and is determined according to AATCC 127. For example, multilayer article 10 can have a hydrostatic head of at least about 55 cm (e.g., at least about 60 cm, at least about 70 cm, at least about 80 cm, at least about 90 cm, or at least about 100 cm) and/or at most about 900 cm (e.g., at most about 800 cm, at most about 600 cm, at most about 400 cm, or at most about 200 cm).

Multilayer article 10 can be used in a consumer product with or without further modifications. Examples of such consumer products include construction materials, such as a housewrap or a roofwrap. Other examples include diapers, adult incontinence devices, feminine hygiene products, medical and surgical gowns, medical drapes, and industrial apparels.

While certain embodiments have been disclosed, other embodiments are also possible.

In some embodiments, an effective amount of various additives can be incorporated in film 12 or nonwoven substrate 14. Suitable additives include pigments, antistatic agents, antioxidants, ultraviolet light stabilizers, antiblocking agents, lubricants, processing aids, waxes, coupling agents for fillers, softening agents, thermal stabilizers, tackifiers, polymeric modifiers, hydrophobic compounds, hydrophilic compounds, anticorrosive agents, and mixtures thereof. In certain embodiments, additives such as polysiloxane fluids and fatty acid amides can be included to improve processability characteristics.

Pigments of various colors can be added to provide the resultant multilayer article 10 that is substantially opaque and exhibits uniform color. For example, multilayer article 10 can have a sufficient amount of pigments to produce an opacity of at least about 85% (e.g., at least about 90%, at least about 95%, at least about 98%, or at least about 99%). Suitable pigments include, but are not limited to, antimony trioxide, azurite, barium borate, barium sulfate, cadmium pigments (e.g., cadmium sulfide), calcium chromate, calcium carbonate, carbon black, chromium(III) oxide, cobalt pigments (e.g., cobalt(II) aluminate), lead tetroxide, lead(II) chromate, lithopone, orpiment, titanium dioxide, zinc oxide and zinc phosphate. Preferably, the pigment is titanium dioxide, carbon black, or calcium carbonate. The pigment can be about 1 percent to about 20 percent (e.g., about 3 percent to about 10 percent) of the total weight of film 12 or nonwoven substrate 14. Alternatively, the pigment can be omitted to provide a substantially transparent multilayer article.

In some embodiments, certain additives can be used to facilitate manufacture of multilayer article 10. For example, antistatic agents can be incorporated into film 12 or nonwoven substrate 14 to facilitate processing of these materials. In addition, certain additives can be incorporated in multilayer article 10 for specific end applications. For example, anticorrosive additives can be added if multilayer article 10 is to be used to package items that are subject to oxidation or corrosion. As another example, metal powders can be added to provide static or electrical discharge for sensitive electronic components such as printed circuit boards.

Each of film 12 and nonwoven substrate 14 can also include a filler. The term "filler" can include non-reinforcing fillers, reinforcing fillers, organic fillers, and inorganic fillers. For example, the filler can be an inorganic filler such as talc, silica, clays, solid flame retardants, Kaolin, diatomaceous earth, magnesium carbonate, barium carbonate, magnesium sulfate, calcium sulfate, aluminum hydroxide, zinc oxide, magnesium hydroxide, calcium oxide, magnesium oxide, alumina, mica, glass powder, ferrous hydroxide, zeolite, barium sulfate, or other mineral fillers or mixtures thereof. Other fillers can include acetyl salicylic acid, ion exchange resins, wood pulp, pulp powder, borox, alkaline earth metals, or mixtures thereof. The filler can be added in an amount of up to about 60 weight percent (e.g., from about 2 weight percent to about 50 weight percent) of film 12 or nonwoven substrate 14.

In some embodiments, the surface of film 12 or nonwoven substrate 14 can be at least partially treated to promote adhesion. For example, the surface of film 12 or nonwoven substrate 14 can be corona charged or flame treated to partially oxidize the surface and enhance surface adhesion. Without wishing to be bound by theory, it is believed that multilayer article 10 having enhanced surface adhesion can enable printing on its surface using conventional inks Ink jet receptive coating can also be added to the surface of multilayer article 10 to allow printing by home or commercial ink jet printers using water based or solvent based inks.

The following example is illustrative and not intended to be limiting.

Example 1

The following two multilayer articles were prepared: (1) TYPAR (i.e., a polypropylene spunbonded nonwoven substrate available from Fiberweb, Inc) having a unit weight of 1.9 ounce per square inch and coated with a microporous breathable film containing 60 wt % polypropylene, 20 wt % KRATON (i.e., a styrenic block copolymer serving as a compatibilizer) available from Kraton Polymers U.S. LLC (Houston, Tex.), and 20 wt % styrene (i.e., a conventional immiscible polymer), and (2) a multilayer article similar to multilayer article (1) except that it contained a microporous breathable film that included 65 wt % polypropylene, 30 wt % APEL (i.e., an exemplary polycycloolefin copolymer disclosed herein), and 5 wt % low-density polyethylene. Both multilayer articles were formed by extruding the microporous breathable film onto TYPAR at 480° F. and had total film unit weights of 22 gsm.

Multilayer article (1) and (2) were evaluated for their MVTR and their capability of forming uniform breathable films. The MVTR was measured by using ASTM E96-A. The test results are summarized in Table 1 below.

TABLE 1

| Sample | Uniformity Observation | MVTR (Perm) |
|---|---|---|
| (1) | Holes in the film | N/A |
| (2) | Uniform film | 11.1 after ring rolling |

The results showed that, when using a conventional immiscible polymer, the microporous breathable film in multilayer article (1) exhibited poor uniformity (i.e., poor processability) even though it contained as much as 20 wt % of a compatibilizer. Unexpectedly, when using as much as 30 wt % of an exemplary immiscible polymer (i.e., APEL) described in this disclosure, multilayer article (2) exhibited superior uniformity in the microporous breathable film even though no compatibilizer was used in the film.

Other embodiments are in the claims.

What is claimed is:

1. An article, comprising:
    a nonwoven substrate; and
    a microporous breathable film supported by the nonwoven substrate, the microporous breathable film comprising a first polymer comprising at most about 99% of a total weight of the microporous breathable film and an amount of a second polymer comprising at least about 1% of the total weight of the microporous breathable film, the second polymer being immiscible with the first polymer,
    wherein the second polymer has a polymer backbone similar to that of the first polymer such that at least about 5% by weight of the amount of the second polymer is blended with the first polymer, and
    wherein the microporous breathable film is devoid of a pore-forming filler.

2. The article of claim 1, wherein the first polymer comprises a polyolefin and the second polymer comprises a polycycloolefin, a polymethylpentene, or a copolymer thereof.

3. The article of claim 2, wherein the second polymer comprises a poly(cycloolefin-co-olefin).

4. The article of claim 2, wherein the second polymer comprises a poly(norbornene-co-ethylene) or a copolymer formed from ethylene and norbornene substituted with a substituent.

5. The article of claim 2, wherein the first polymer comprises a polyethylene or a polypropylene.

6. The article of claim 5, wherein the first polymer comprises a polyethylene selected from the group consisting of low-density polyethylene, linear low-density polyethylene, high-density polyethylene, and copolymers thereof.

7. The article of claim 5, wherein the film further comprises an elastomer.

8. The article of claim 1, wherein the microporous breathable film is substantially uniform in the absence of a compatibilizer.

9. The article of claim 1, wherein the nonwoven substrate comprises randomly disposed polymeric fibers, at least a portion of the fibers being bonded to one another.

10. The article of claim 1, wherein the article is embossed.

11. The article of claim 2, wherein the article has a moisture vapor transmission rate of at least about 35 g/m$^2$/day when measured at 23° C. and 50 RH %.

12. A construction material, comprising the article of claim 1.

13. The construction material of claim 12, wherein the construction material is a housewrap or a roofwrap.

14. The article of claim 2, wherein:
    the first polymer comprises a polyethylene or a polypropylene; and the second polymer comprises a poly(cycloolefin-co-olefin).

15. The article of claim 14, wherein the film further comprises an elastomer.

16. The article of claim 15, wherein the microporous breathable film is supported by a nonwoven substrate comprising randomly disposed polymeric fibers, at least some of the fibers being bonded to one another.

17. The article of claim 16, wherein:
    the article has a moisture vapor transmission rate of at least about 35 g/m$^2$/day when measured at 23° C. and 50 RH %;
    the article has a unit weight of 1.25 osy;
    the article has a tensile strength of at least about 35 pounds in at least one of the machine direction or the cross-machine direction as measured according to ASTM D5034; and
    the article has a hydrostatic head of at least about 55 cm.

18. The article of claim 1, wherein at least about 30% by weight of the amount of the second polymer is blended with the first polymer.

19. The article of claim 1, wherein 5-30% by weight of the amount of the second polymer is blended with the first polymer.

* * * * *

UNITED STATES PATENT AND TRADEMARK OFFICE
CERTIFICATE OF CORRECTION

PATENT NO. : 9,765,459 B2
APPLICATION NO. : 13/530432
DATED : September 19, 2017
INVENTOR(S) : Mehdi Afshari Page 1 of 1

It is certified that error appears in the above-identified patent and that said Letters Patent is hereby corrected as shown below:

Column 9, Line 35 "tering, embossing, creping, and button-breaking These" should read -- tering, embossing, creping, and button-breaking. These --.

Column 12, Line 39 "enable printing on its surface using conventional inks Ink jet" should read -- enable printing on its surface using conventional inks. Ink-jet --.

Column 12, Line 42 "cial ink jet printers using water based or solvent based inks." should read -- cial ink-jet printers using water based or solvent based inks. --.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*